(12) United States Patent
Mendyk et al.

(10) Patent No.: US 8,939,000 B2
(45) Date of Patent: Jan. 27, 2015

(54) SEAT POST BICYCLE LOCK

(76) Inventors: David Mendyk, Calgary (CA); Neil Blackmore, Calgary (CA); Kara Chomistek, Calgary (CA)

(*) Notice: Subject to any disclaimer, the term of this patent is extended or adjusted under 35 U.S.C. 154(b) by 299 days.

(21) Appl. No.: 13/495,738

(22) Filed: Jun. 13, 2012

(65) Prior Publication Data

US 2012/0312058 A1  Dec. 13, 2012

Related U.S. Application Data

(60) Provisional application No. 61/496,061, filed on Jun. 13, 2011.

(51) Int. Cl.
*E05B 71/00* (2006.01)
*B62H 5/00* (2006.01)

(52) U.S. Cl.
CPC .............. *B62H 5/006* (2013.01); *E05B 71/00* (2013.01)
USPC ...... 70/233; 70/18; 70/49; 70/261; 297/195.1

(58) Field of Classification Search
CPC ....... E05B 71/00; E05B 67/003; B62H 5/003; B62H 5/001; B62H 5/06; B62H 5/00
USPC .................. 70/14, 15, 18, 19, 30, 49, 51–53, 70/225–228, 232–236, 261; 297/195.1; 211/1.3; 248/551–553; 280/288.4
See application file for complete search history.

(56) References Cited

U.S. PATENT DOCUMENTS

| | | | | |
|---|---|---|---|---|
| 589,861 A * | 9/1897 | Schroeder | ........................ | 70/236 |
| 746,365 A * | 12/1903 | McNary | ........................... | 70/236 |
| 3,908,414 A * | 9/1975 | Thorne | ............................ | 70/18 |
| 3,922,894 A * | 12/1975 | Johnson | ........................... | 70/18 |
| 4,065,945 A * | 1/1978 | Jaulmes | ............................ | 70/58 |
| 4,760,718 A * | 8/1988 | Muramatsu et al. | ............ | 70/18 |
| 5,018,374 A * | 5/1991 | Montano | ........................ | 70/233 |
| 5,251,464 A | 10/1993 | Halter | | |
| 5,251,465 A * | 10/1993 | Hwang | .......................... | 70/209 |
| 5,325,689 A * | 7/1994 | Warner | .......................... | 70/233 |
| D352,444 S * | 11/1994 | Warner | .......................... | D8/333 |
| 5,380,061 A * | 1/1995 | Pendleton | .................. | 297/195.1 |
| 5,475,993 A * | 12/1995 | Kuo | ................................... | 70/18 |
| 5,487,285 A * | 1/1996 | Leichel et al. | ..................... | 70/18 |
| 5,513,508 A * | 5/1996 | Saunders et al. | ................ | 70/233 |
| 5,558,349 A * | 9/1996 | Rubin | ........................... | 280/287 |
| 5,598,727 A * | 2/1997 | White | ............................ | 70/233 |
| 5,618,052 A * | 4/1997 | Rendall | ..................... | 280/288.4 |
| 5,622,066 A * | 4/1997 | Shallis | ........................... | 70/233 |
| 5,678,435 A * | 10/1997 | Hodson | .......................... | 70/233 |
| 5,732,577 A * | 3/1998 | Okada et al. | ...................... | 70/18 |
| 5,785,289 A * | 7/1998 | Shieh | ......................... | 248/230.1 |

(Continued)

*Primary Examiner* — Lloyd Gall
(74) *Attorney, Agent, or Firm* — Kyle R. Satterthwaite; Ryan W. Dupuis; Ade & Company Inc.

(57) ABSTRACT

The invention provides a bicycle lock with three rigid lock rods, either separable or articulating, which together provide an adaptable secure frame-to-wheel-to-security-object bicycle locking mechanism in conjunction with a removable seat post. One rod is inserted partially into the removed seat post, and the other rods extend outward from the first rod and then back toward the seat post for locking to a seat post clamp thereon, thus forming a closed triangular lock. The lock can be passed through the bicycle frame and wheel and around a bike rack or other external structure before closing to secure both the frame, wheel and seat post to the structure to prevent theft of any one or more of these components.

18 Claims, 30 Drawing Sheets

(56) References Cited

U.S. PATENT DOCUMENTS

| | | | | |
|---|---|---|---|---|
| 5,913,906 A | * | 6/1999 | Strocchi | 70/18 |
| 6,415,635 B1 | * | 7/2002 | Jonasson | 70/59 |
| 6,581,954 B2 | * | 6/2003 | Chadwick | 280/491.1 |
| 6,751,992 B1 | * | 6/2004 | Esquilin | 70/233 |
| 6,820,448 B1 | * | 11/2004 | Hsieh | 70/18 |
| 6,948,878 B1 | * | 9/2005 | Smith et al. | 403/110 |
| 7,104,091 B2 | | 9/2006 | Kuhblank | |
| 7,581,787 B2 | | 9/2009 | Livne | |
| 7,624,605 B2 | * | 12/2009 | Vitali | 70/233 |
| 8,534,754 B2 | * | 9/2013 | Livne | 297/201 |
| 8,555,682 B2 | * | 10/2013 | Trunek | 70/58 |
| 8,776,560 B2 | * | 7/2014 | Loughlin et al. | 70/233 |
| 2002/0113403 A1 | * | 8/2002 | Chen | 280/288.4 |
| 2003/0074933 A1 | * | 4/2003 | St. Amand | 70/18 |
| 2008/0309130 A1 | | 12/2008 | Livne | |
| 2009/0078009 A1 | | 3/2009 | Docking | |
| 2010/0187868 A1 | | 7/2010 | Livne | |
| 2012/0131966 A1 | * | 5/2012 | Yuan | 70/233 |

* cited by examiner

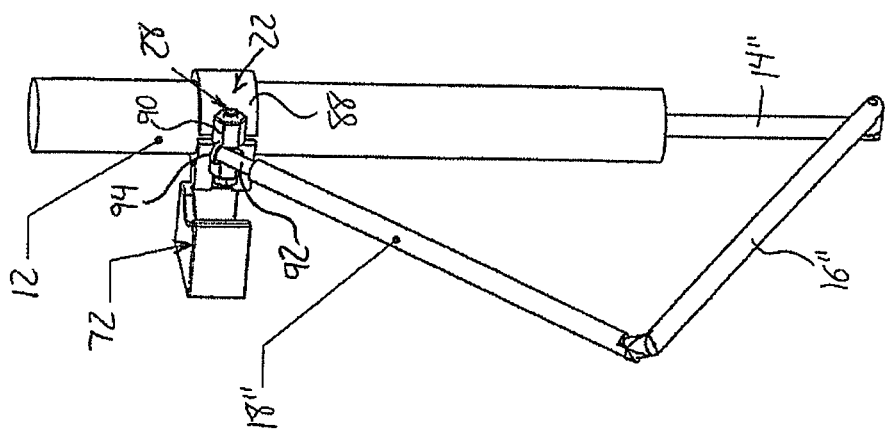
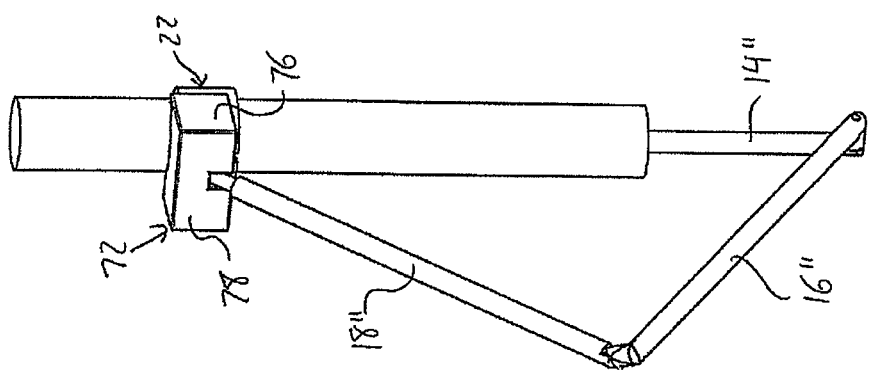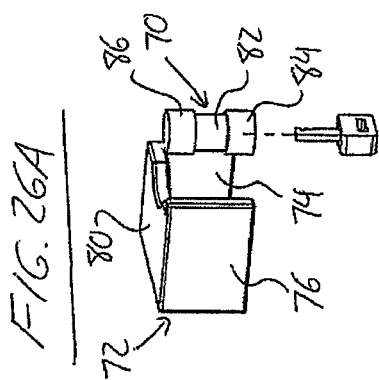

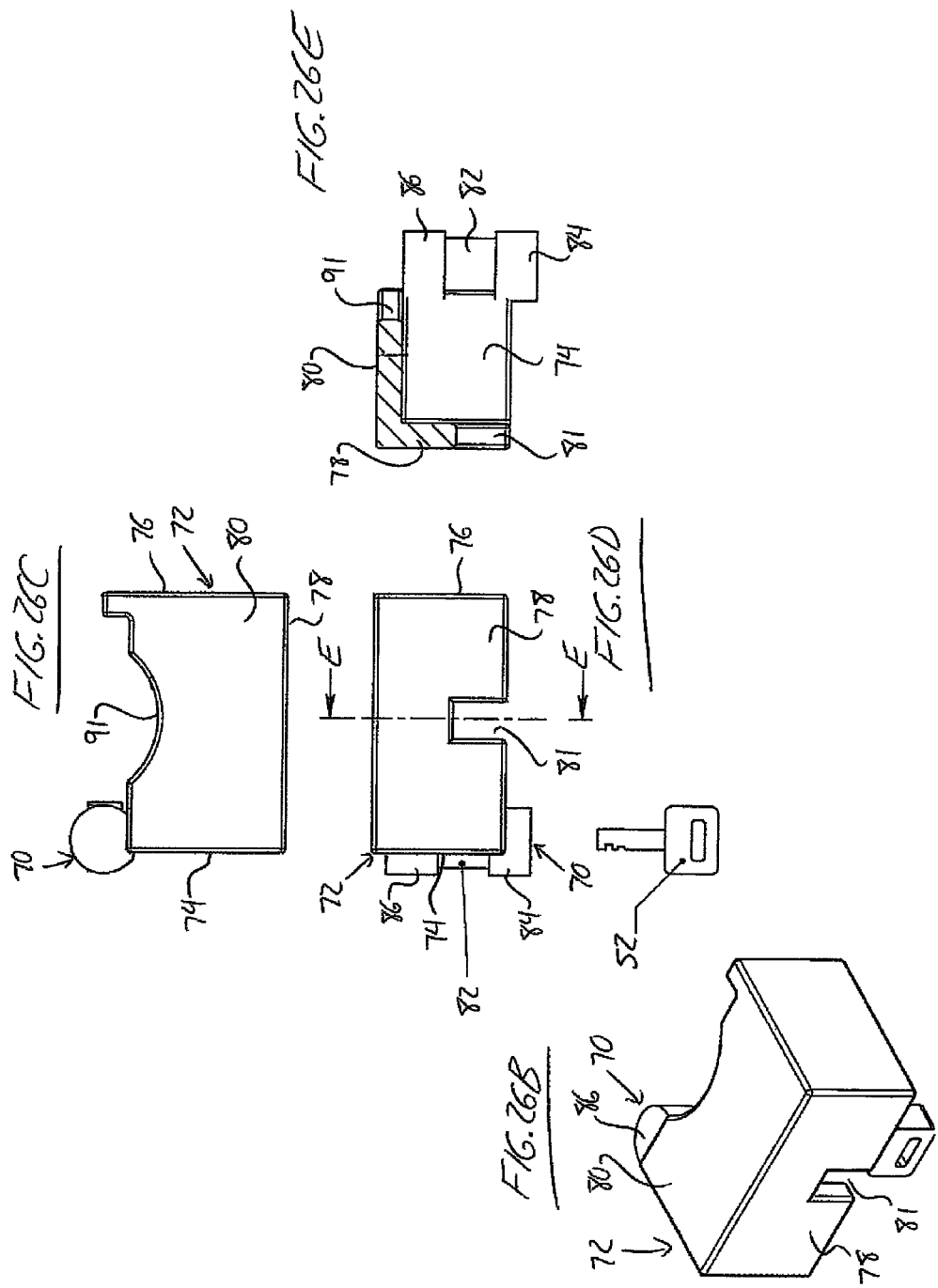

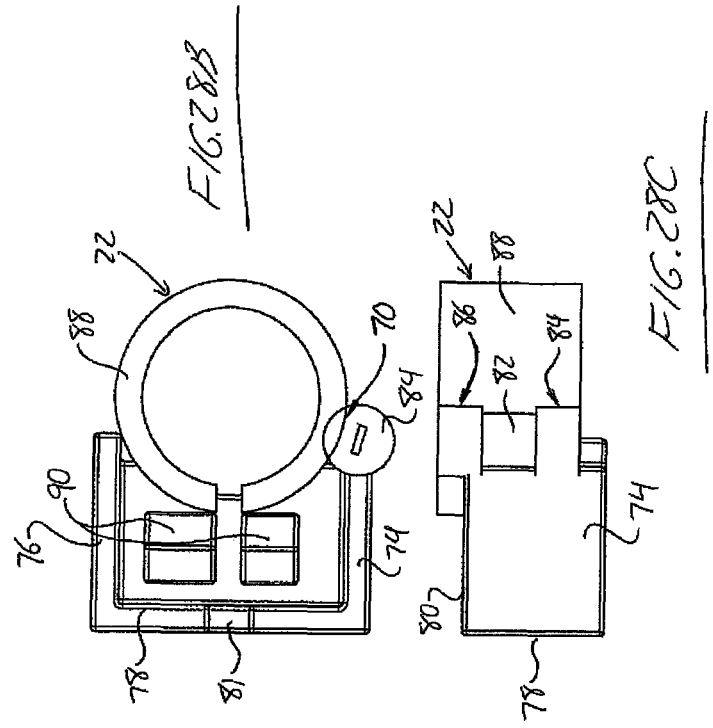
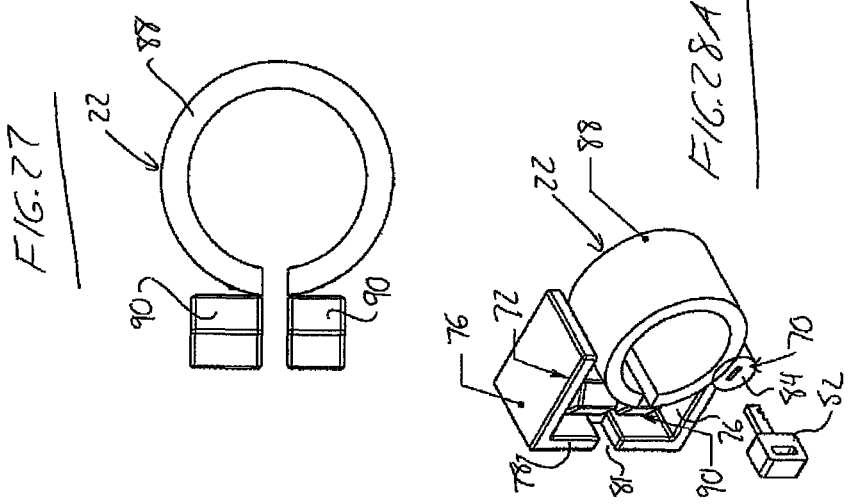

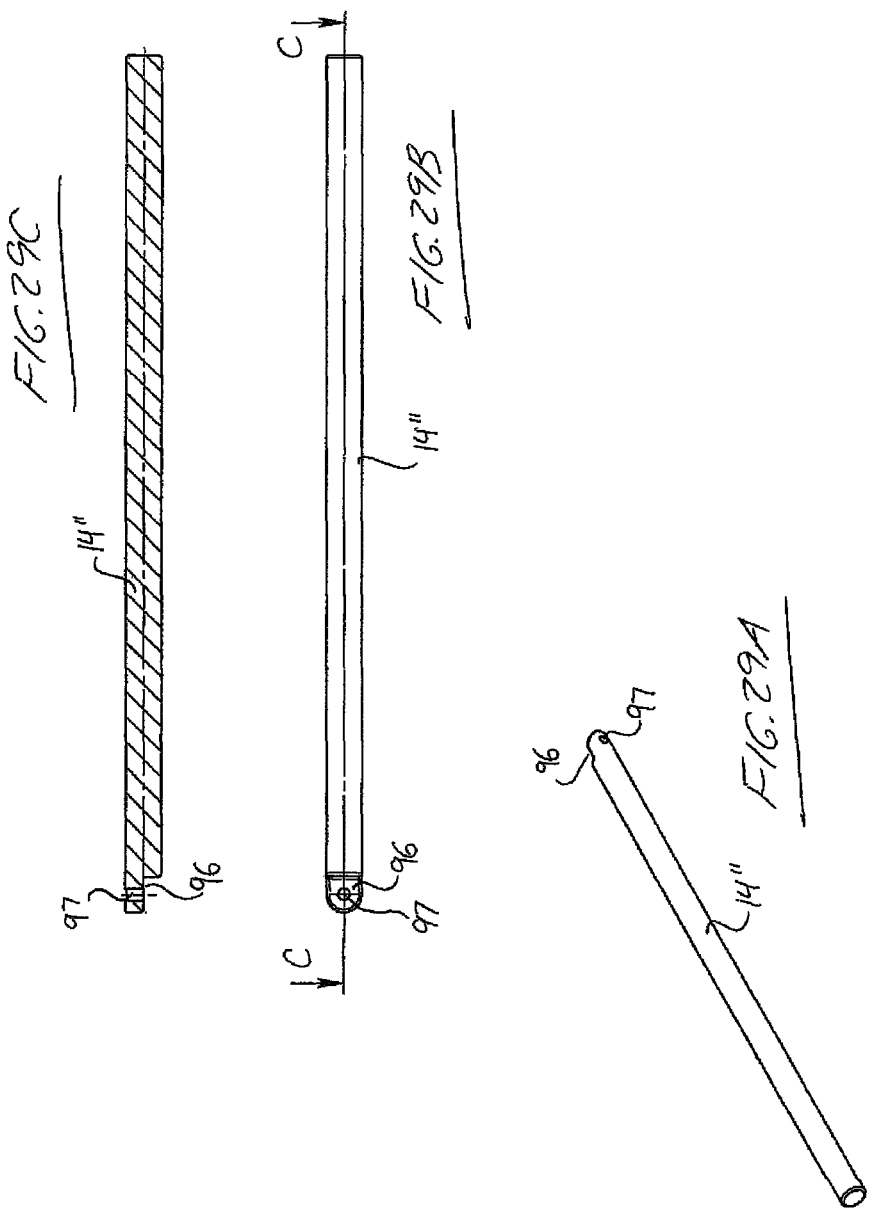

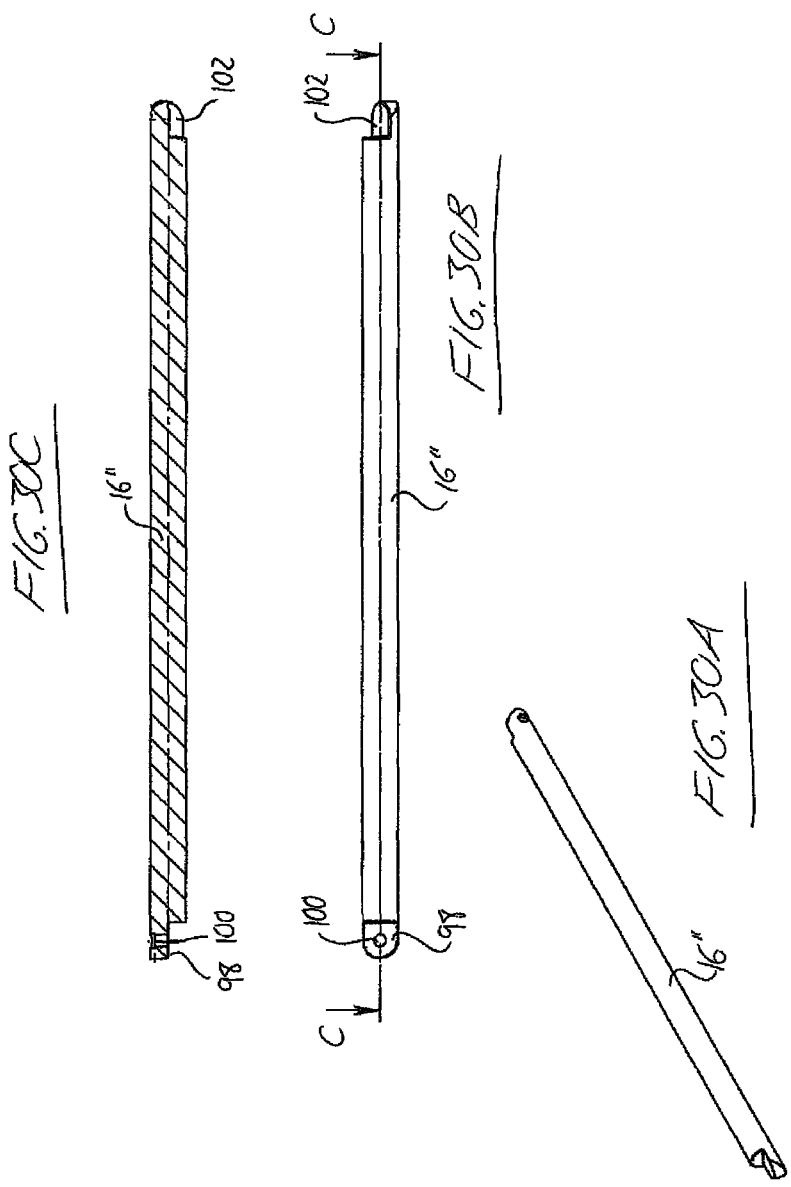

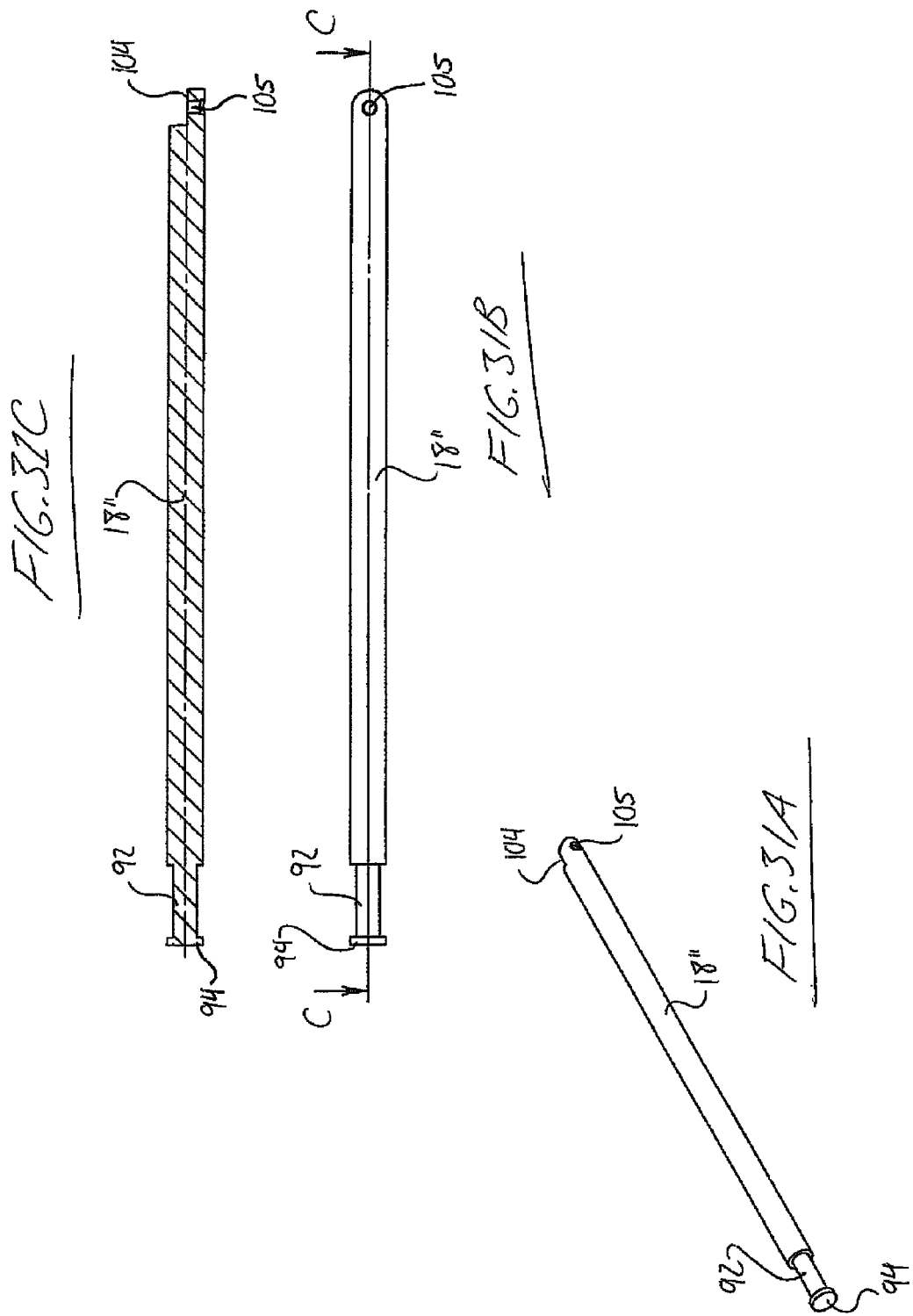

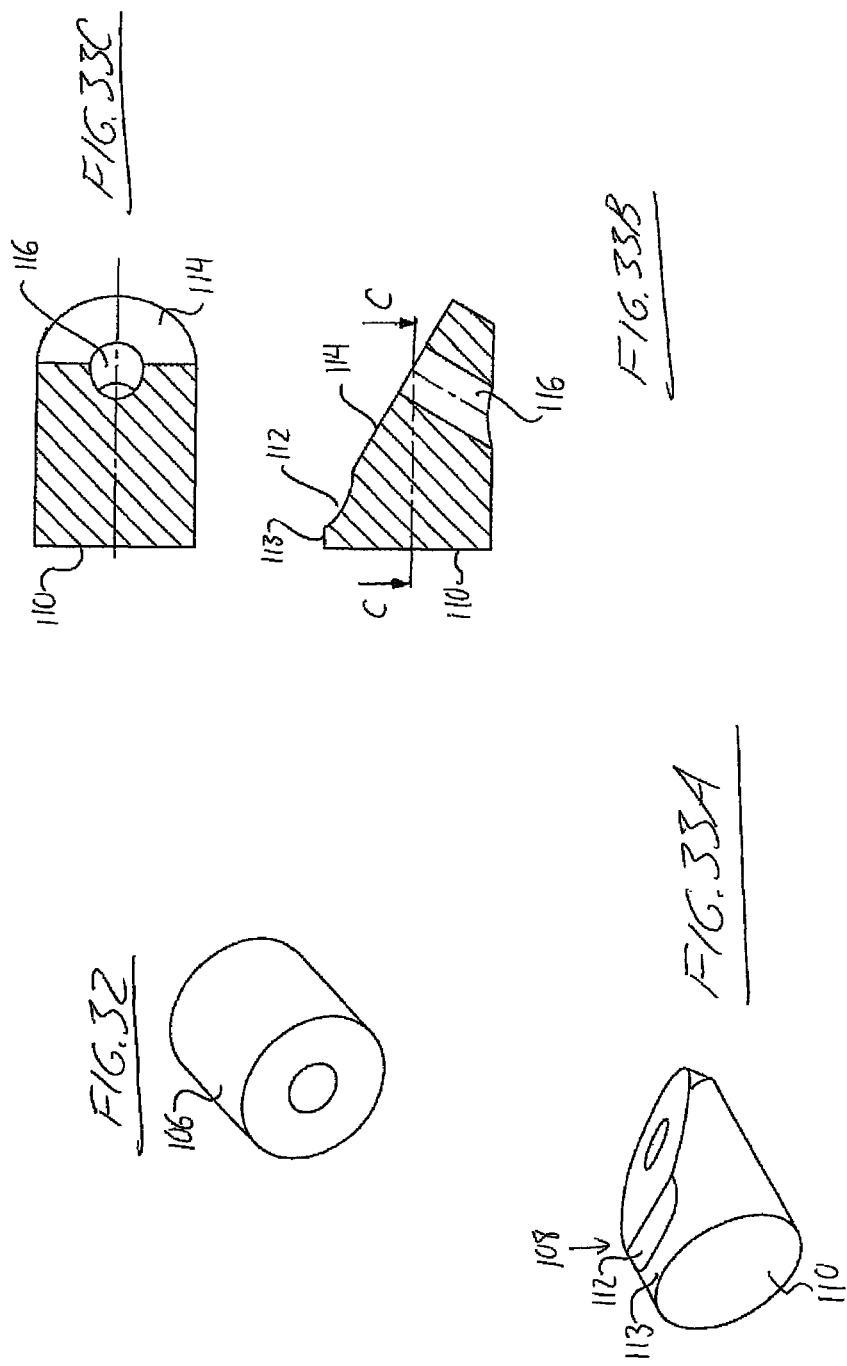

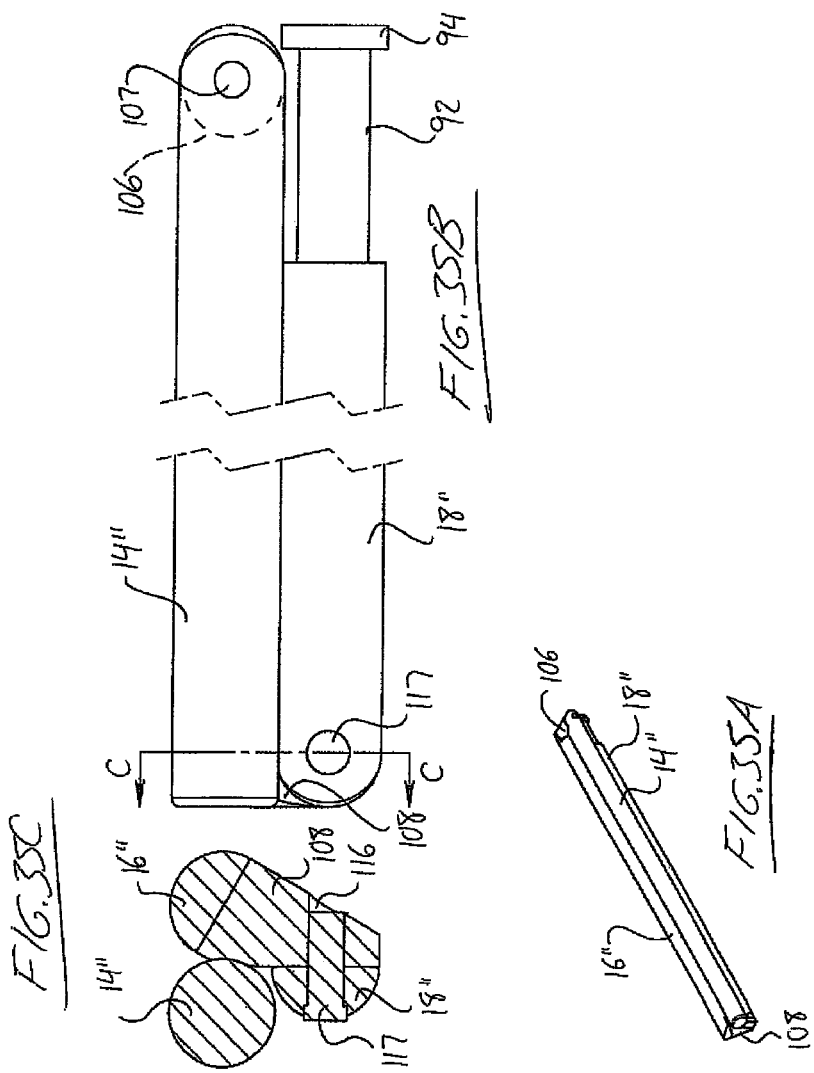

SEAT POST BICYCLE LOCK

CROSS REFERENCE TO RELATED APPLICATIONS

This application claims benefit under 35 U.S.C. 119(e) of U.S. Provisional Patent Application Ser. No. 61/496,061, filed Jun. 13, 2011, the entirety of which is incorporated herein by reference.

FIELD OF THE INVENTION

The present invention relates generally to the field of locking mechanisms for bicycles, and more particularly to a locking mechanism cooperable with the seat post of a bicycle to effect a locking action that can be used to both lock the removable seat post to the bicycle, and lock the overall bicycle to another structure.

BACKGROUND OF THE INVENTION

Bicycles are particularly prone to theft as their workings are necessarily exposed and in many cases designed to be disassembled quickly without special tools. Their weight limits and need for streamlining make the problem even more difficult to solve. A variety of proposals have been made which appear on the Internet including use of the removable seat post and seat combination as a frame lock in combination with the handle bars. Another attached a retractable locking cable to the seat post for storage. In use the seat and post are removed, the cable extended around a secure object and then locked back on the retraction mechanism. Yet another attaches a clamp to the outside of the seat post which can be secured directly to the bicycle frame.

A variety of US pending patent applications 2008/0309130 published 2008 Dec. 18 and USPPA 2010/0187868 2010 Jul. 29 by Livne show a bicycle lock mechanism which is stored when not in used between the seat post and the seat with its components below the seat itself. Livne issued as U.S. Pat. No. 7,581,787 in 2009. This provides a complex set of extra components which essentially replaces the top of the typical seat post with the lock assembly. Components extend forward of the seat and detract from the utility of the bicycle at a critical juncture.

U.S. Pat. Nos. 5,251,464 and 7,104,091 issued in 1993 and 2006 respectively show a retractable reel of locking cable secured to a bicycle seat post.

US published patent application 2009/0078009 published Mar. 26, 2009 shows a separable frame component used for a cable lock.

None of the prior art items have effectively provided a secure and storable bicycle locking mechanism which does not interfere with the bicycle when in use, is light weight, uses existing bicycle components and is readily stored.

SUMMARY OF THE INVENTION

According to a first aspect of the invention there is provided a seat post bicycle lock for cooperation with a seat post of a bicycle, the bicycle seat post lock comprising:

a series of rods including a plurality of lock rods and an insertion rod that is arranged for insertion into the seat post through a free end thereof in a position leaving an exposed end of said insertion rod outside the seat post, the rods being arranged to be secured together end-to-end at relative angles to one another outside the seat post to lie on respective sides of a polygonal area with the insertion rod at one end of the series and a final one of the lock rods at a second end of the series;

a clamp arranged to clamp around the seat post at a distance from the free end thereof; and a lock mechanism attached to the clamp and arranged to lock the final one of the lock rods to the clamp.

Preferably the plurality of lock rods consist of a first lock rod and a second lock rod, the second lock rod defining the final one of the lock rods.

Preferably the series of rods are connected by pivotal joints therebetween.

Preferably the series of rods and the pivotal joints are configured to enable folding of the series of rods into a storage condition in which the rods lie parallel to one another.

Preferably longitudinal axes of the series of rods occupy a triangular configuration when in the storage condition to lie on vertices of a triangle in a cross-sectional plane perpendicular to said longitudinal axes.

The series of rods may comprise two straight rods and a third bent rod coupled together for pivoting in a common plane, with a bend in the bent rod deviating from the common plane to bend over an end of one of the two straight rods to position a linear portion of the bent rod in the triangular configuration with the two straight rods.

Alternatively, an oblique spacer may be disposed between two of the rods to situate a pivot axis between said two of the rods at a radial distance outward from the longitudinal axes of said rods and pivot the two rods in different respective parallel planes.

Preferably the series of rods, when in the storage condition, are fittable together within the seat post.

Preferably the lock mechanism is key operated.

Preferably the lock mechanism is operable to both close the clamp around the seat post and lock the final one of the lock rods to the clamp.

Preferably the lock mechanism comprises a cover member pivotally coupled to the clamp for movement into and out of a lockable position in which the cover member conceals a closure of the clamp and captures an end of the final one of the lock rods.

Preferably the cover member comprises a slotted wall spaced outwardly from the clamp to leave an accommodating space between the slotted wall and the clamp for receipt of an enlarged portion of the final one of the lock rods adjacent the end thereof, the slotted wall having a slot therein running parallel to an axis about which the seat clamp extends, the slot having a width sufficient to slide over a reduced diameter portion of the final one of the lock rods on a side of the enlargement opposite the end of said final one of the lock rods.

Preferably the cover member is arranged to pivot about a pivot axis that is parallel to a seat post axis about which the clamp extends.

Preferably the lock mechanism comprises a key cylinder operable to switch between locked and unlocked states respectively preventing and allowing pivotal movement of the cover member from the lockable position.

According to a second aspect of the invention there is provided a seat post bicycle lock for cooperation with a seat post of a bicycle, the bicycle seat post lock comprising:

an insertion rod arranged for insertion into the seat post through a free end thereof;

a first lock rod arranged to have a proximal end thereof secured to the insertion rod at an exposed end thereof outside the seat post and to extend from said insertion rod at a first angle;

a second lock rod arranged to have a proximal end thereof secured to the first lock rod at a distal end of the first lock rod and to extend from said first lock rod at a second angle;

a clamp arranged to clamp around the seat post at a distance from the free end thereof; and a lock mechanism attached to the clamp and arranged for locked engagement with a distal end of the second lock rod.

BRIEF DESCRIPTION OF THE DRAWINGS

In the accompanying drawings, which illustrate exemplary embodiments of the present invention:

FIG. 24 is a partial elevation depicting the opened and folded lock of

FIG. 23 partially re-inserted into the seat post for storage.

FIG. 25A is a perspective view of a third embodiment of the bicycle lock of the invention in a locked condition on a bicycle seat post.

FIG. 25B is a perspective view of the third embodiment bicycle lock in an unlocked condition on the bicycle seat post.

FIGS. 26A and 26B are top perspective views of a cover member and locking mechanism of the third embodiment bicycle lock.

FIGS. 26C and 26D are top plan and elevational views of the cover member and locking mechanism of the third embodiment bicycle lock.

FIG. 26E is a cross-sectional view of the cover member and locking mechanism of FIG. 26D as taken along line E-E thereof.

FIG. 27 is a plan view of the seat post clamp of the third embodiment bicycle lock cover.

FIGS. 28A, 28B and 28C are perspective, bottom plan and elevational views of the cover member and locking mechanism of the third embodiment bicycle lock as installed on the seat post clamp.

FIGS. 29A and 29B are perspective and side views of the internal rod of the third embodiment bicycle lock cover.

FIG. 29C is a cross-sectional view of the internal rod of FIG. 29B as taken along line C-C thereof.

FIGS. 30A and 30B are perspective and side views of the first lock rod of the third embodiment bicycle lock cover.

FIG. 30C is a cross-sectional view of the first lock rod of FIG. 30B as taken along line C-C thereof.

FIGS. 31A and 31B are perspective and side views of the second lock rod of the third embodiment bicycle lock cover.

FIG. 31C is a cross-sectional view of the second lock rod of FIG. 31B as taken along line C-C thereof.

FIG. 32 is a perspective view of a cylindrical spacer of the third embodiment bicycle lock cover for use in a pivotal connection between the internal and first lock rods thereof.

FIGS. 33A and 33B are perspective and cross-sectional views of a non-cylindrical angular spacer of the third embodiment bicycle lock cover for use in a pivotal connection between the lock rods thereof.

FIG. 33C is a cross-sectional view of the angular spacer of FIG. 33B as taken along line C-C thereof.

FIGS. 35A and 35B are perspective and side views of the rods of the third embodiment bicycle lock cover in a folded condition for storage in the bicycle seat post.

FIG. 35C is a cross-sectional view of the folded rods of FIG. 35B as taken along line C-C thereof.

DETAILED DESCRIPTION

Figure 1:
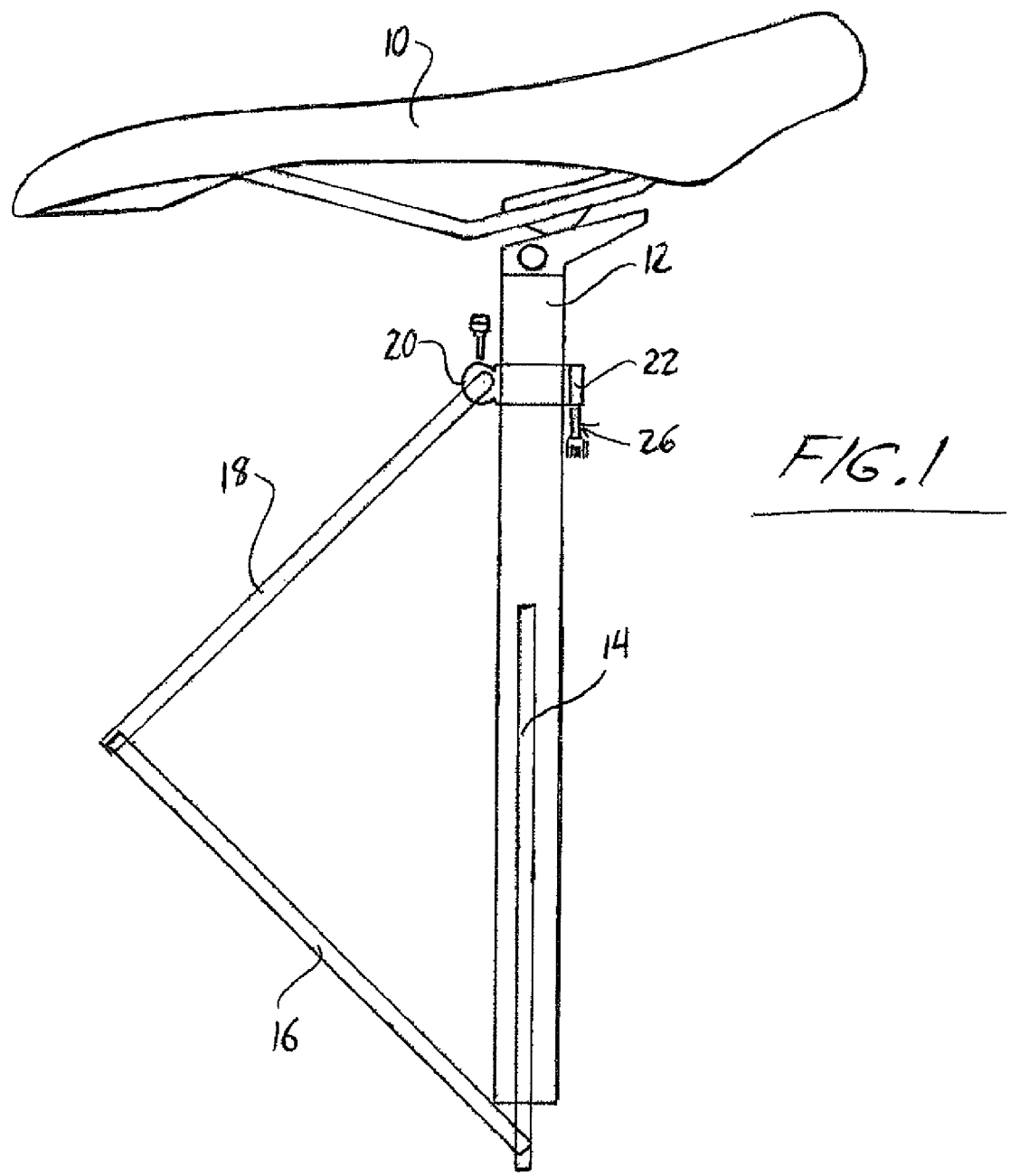
FIG. 1 is an elevation of a first embodiment of the bicycle lock of the invention in fully assembled configuration.

A first embodiment of the lock of the invention is shown in overall view in FIG. 1 showing the seat 10 and seat post 12 removed from the bicycle frame (not shown), as is the custom for locking. The lock includes three interacting solid rods, the internal rod 14, a first lock rod 16 and a second lock rod 18. The internal rod 14 is slid into the lower extremity of the seat post 12. The first lock rod 16 is secured to the lower extremity of the internal rod 14. The second lock rod 18 is then secured to the upper extremity of the first lock rod 16. The male or upper end of the second lock rod is secured with and then locked in place to the seat post 12 at the key lock 20, which itself is secured to the seat post by the clamshell seat post clamp 22 and clamp lock 26. The three rods plus the seat post form a solid triangular lock mechanism which can be threaded through the bicycle frame and a wheel of the bicycle and around a solid object such as a bicycle stand or lamp standard before being closed, and then locked in place with a last simple act of insertion and key rotation.

Figure 7:
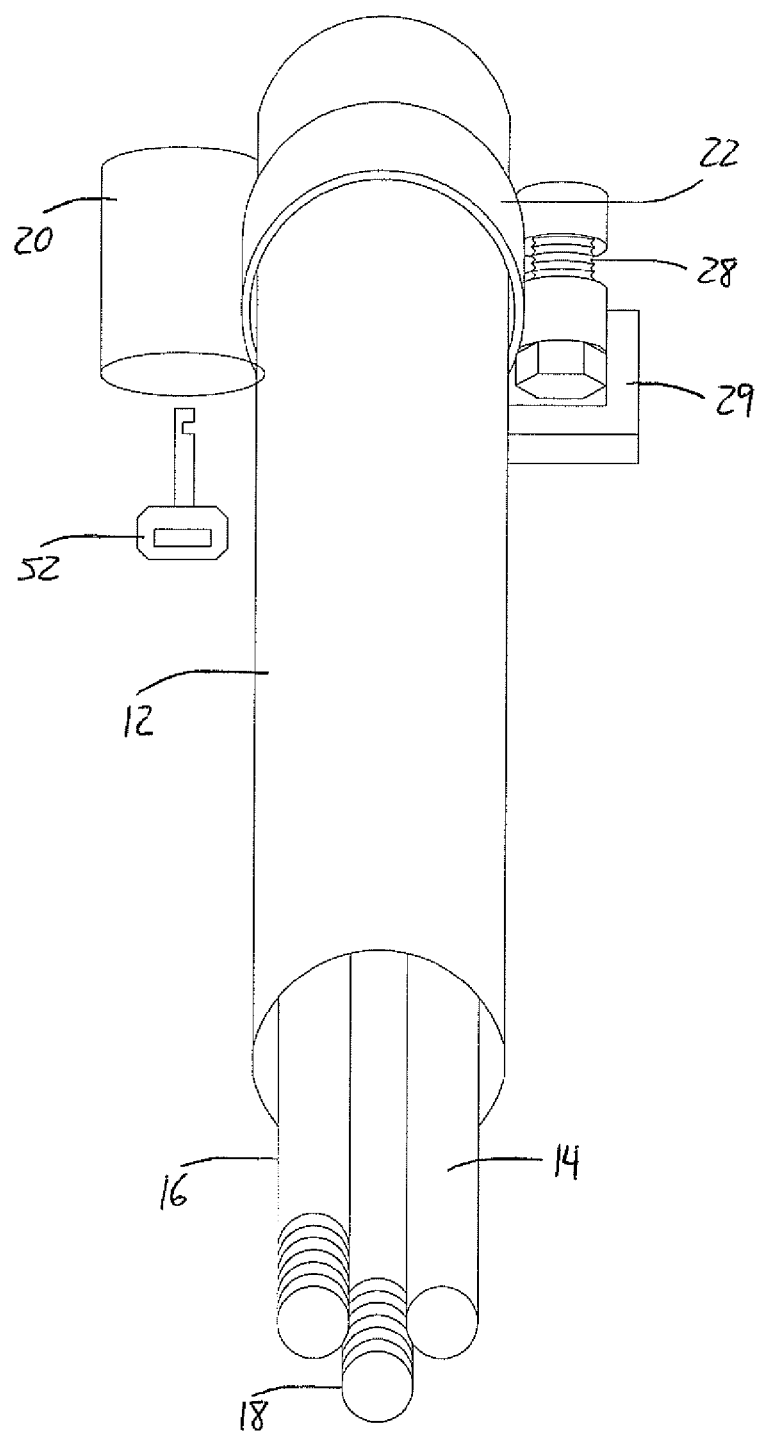
FIG. 7 is a perspective view of the lock of FIGS. 2 and 3 showing the lock components stored inside the seat post when not in use.

In FIG. 7 the lock is shown fully unassembled and in its storage position inside the seat post where it may remain without much additional weight and without interference with cycle operation until its use is required. Only the seat post clamshell clamp 22, the tightening bolt 28, the clamp lock 26 and a pivotable bolt head cover 29 thereof, and the key lock 20 remain to the exterior of the seat post 12. All of these exterior components are well out of the way below the seat 10, but at a distance above the free lower end of the seat post.

Figure 3:
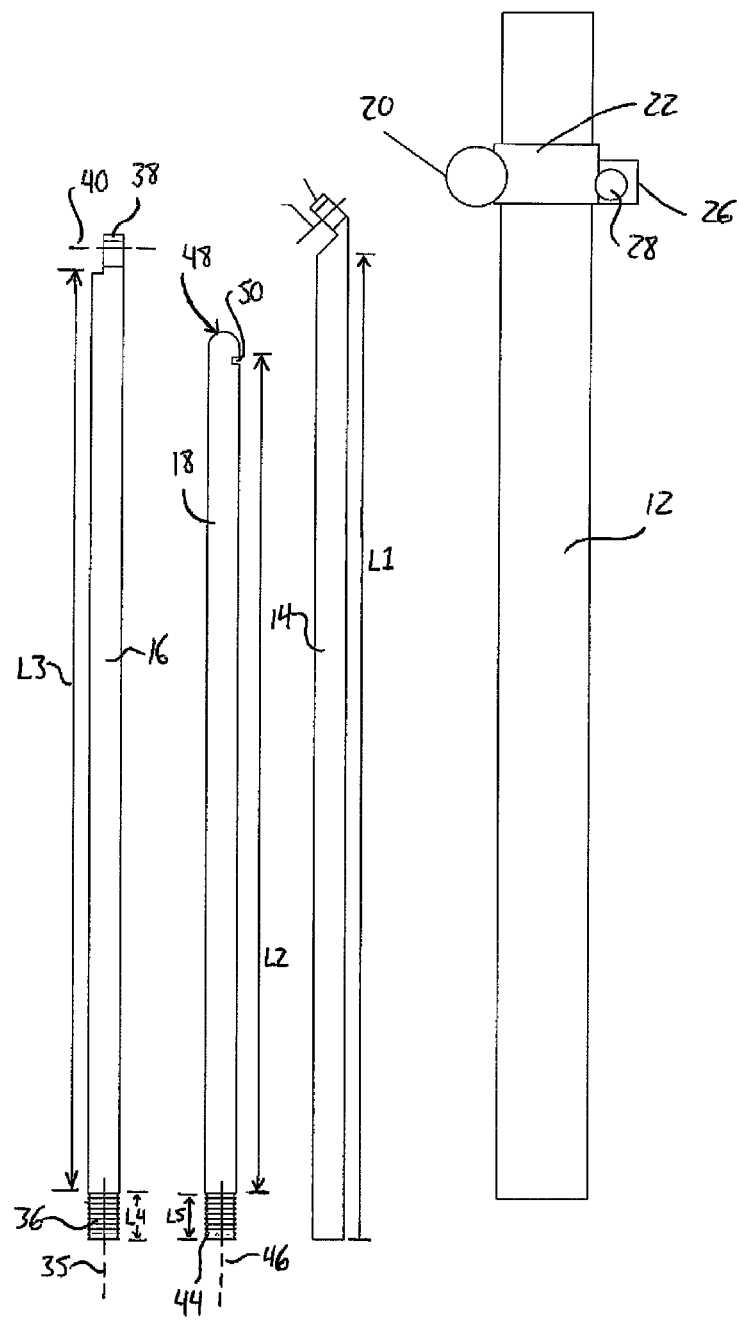
FIG. 3 is an elevation of the bicycle lock of FIG. 2 in dissembled configuration.

In FIG. 3 the lock is shown unassembled with its parts removed from the seat post 12. The internal rod 14, length L1, extends to an exposed end outside the seat post with an offset nut 30 oriented with its axis 32 along a first assembly axis, which is substantially off the main internal rod axis 34, as shown.

The first lock rod 16, length L3, includes a first threaded portion 36 at its proximate end with an extended length L4 along its main rod axis 35. The first threaded portion 36 is adapted to thread into the offset nut 30 of the internal rod and provide a substantial oblique angle between these rods.

At its distal end, first lock rod 16 includes an in line nut 38 whose thread axis 40, the second assembly axis, is preferably substantially perpendicular to the first lock rod axis 35.

The second lock rod 18, length L2, includes at its proximate end a short threaded portion 44, length L5, threaded along its main second rod axis 46. At its distal end the second lock rod includes a male end 48 incorporating a lock detent slot 50.

Preferably, the length L4 is substantially greater than the length L5.

For assembly, as in FIG. 3, the internal rod is inserted into the open hollow end of the seat post a convenient distance.

The first lock rod is then secured to the internal rod at the first assembly joint as by turning its first threaded portion about the first assembly axis into and through the offset nut of the internal rod so as to form a first oblique lock angle A1 between the first lock rod and both of the internal rod and the seat post. The second lock rod is then secured to the first lock rod in a similar manner at the second assembly joint as by turning about the second assembly axis, thereby engaging the second threaded portion with the in line nut of the first lock rod. Thereby, a second oblique A2 lock angle is formed between the first and second lock rods. The first lock rod is no longer free to rotate about its own axis, i.e. the first assembly axis, without corresponding rotation of the second lock rod.

Figure 2:
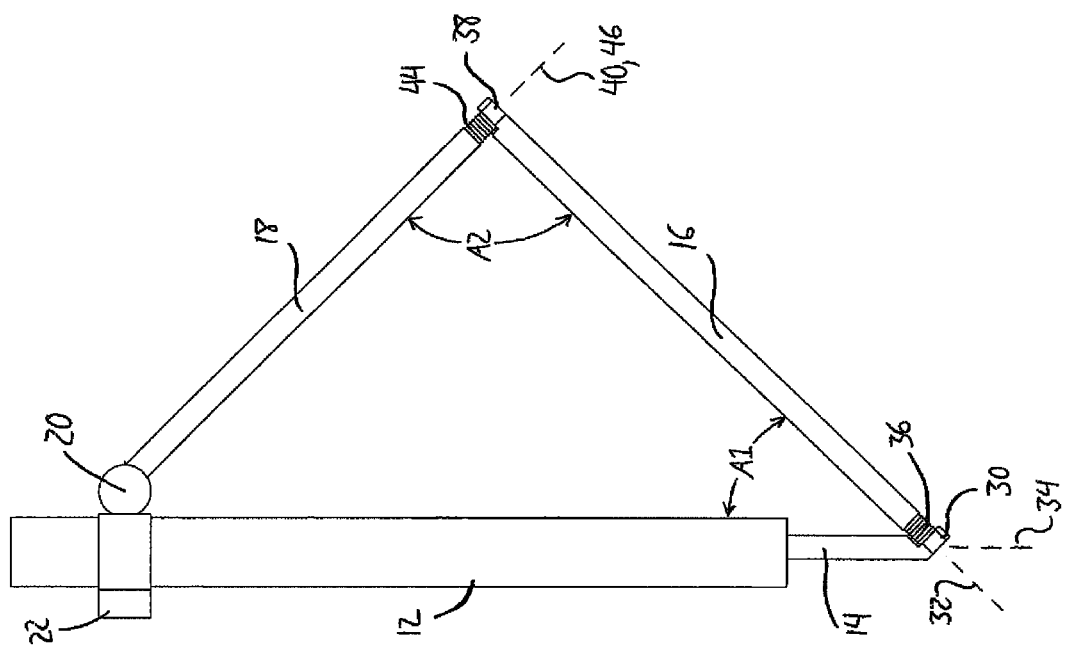
FIG. 2 is another elevation of the assembled bicycle lock of FIG. 1.

The whole open assembly is then free to be threaded through the bicycle frame, any wheels and any security object or bike rack while remaining assembled. Once in a final locking position the male end or the second lock rod is inserted into the key lock. Operation of the key 52 rotates a tumbler and a lock detent engages with the male end slot 50 to both prevent further movement and secure the bicycle lock of the invention into a rigid locking structure in conjunction with the seat post as shown in FIG. 2. Once locked the lock rods are no longer free to rotate about their main corresponding assembly axes and the lock can only be removed by destructive dis-assembly by a determined thief. Fabrication of the locking rods of light weight and very strong solid materials (or laminated materials) adds almost nothing to the overall weight of the bicycle and provides a very strong locking structure which disappears when not in use. The rods are preferably solid for optimum strength and theft resistance.

Figure 6:
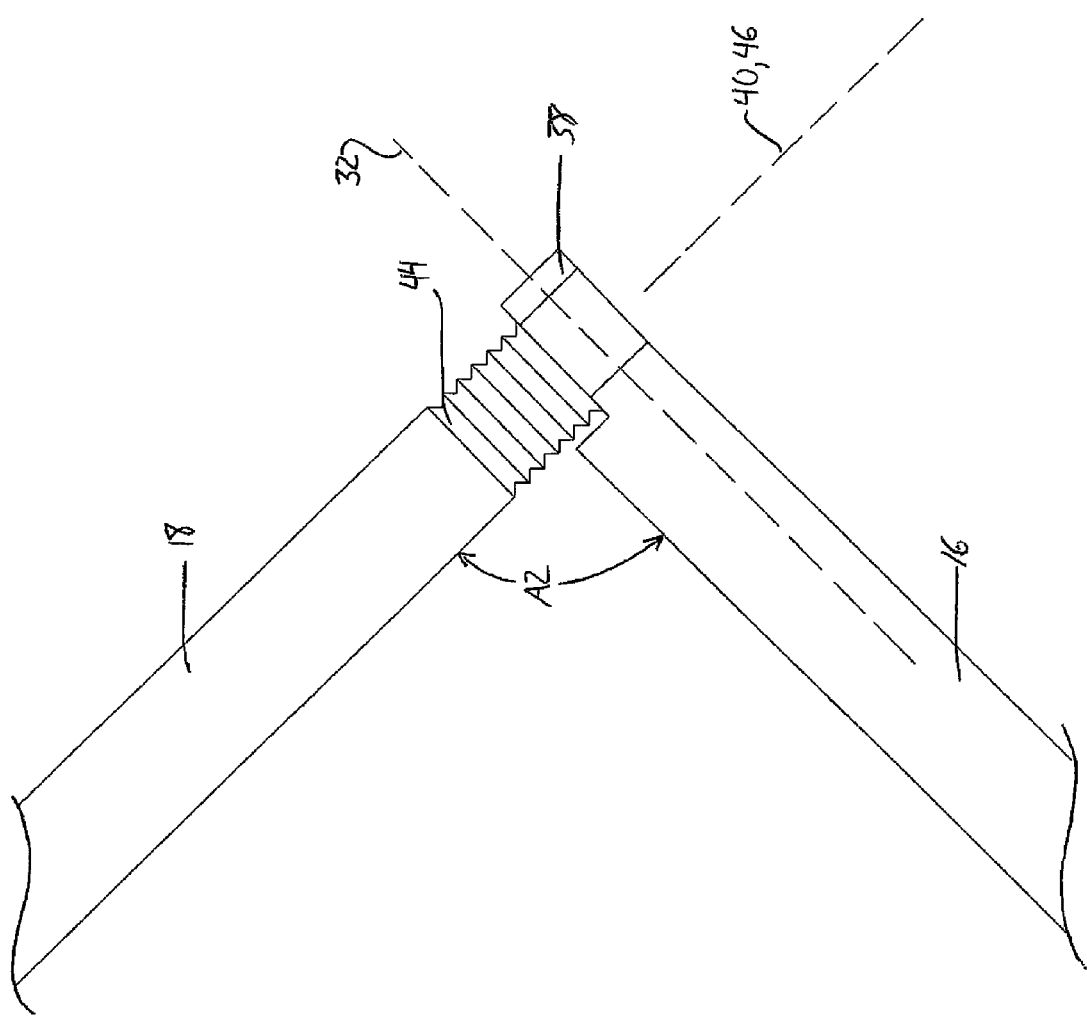
FIG. 6 is a partial elevation of the second lock angle as assembled.
Figure 8:
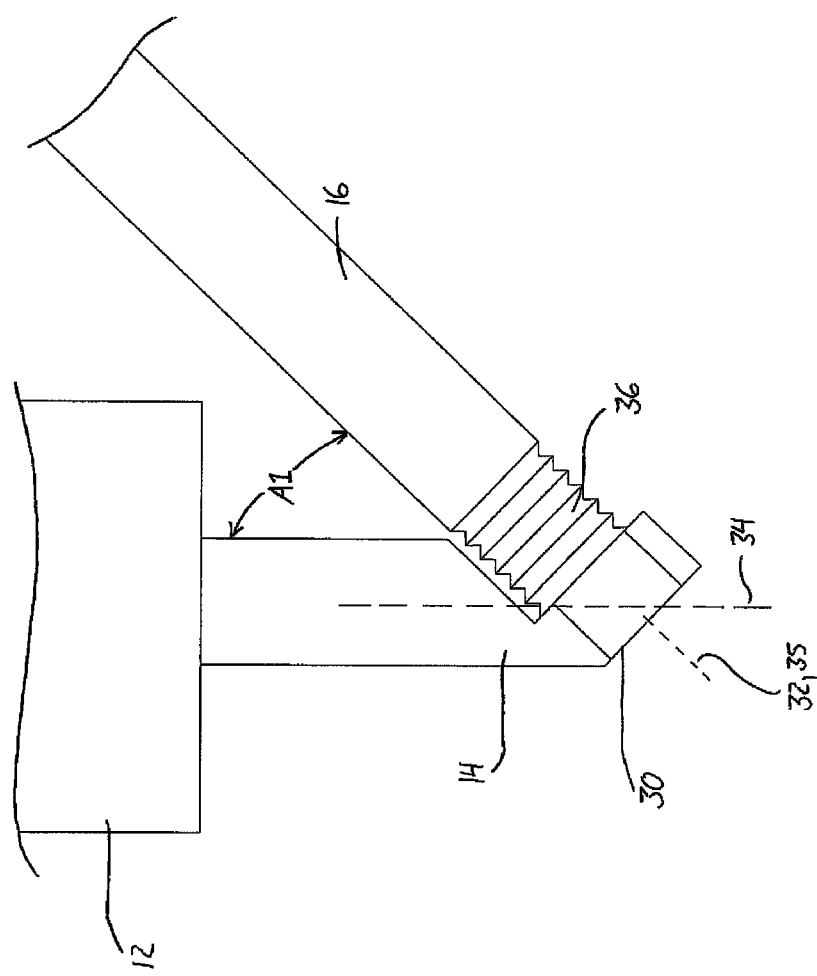
FIG. 8 is a partial elevation of the first lock angle as assembled.

Expanded views of the first and second assembly joints are shown in FIGS. 8 and 6 respectively. At FIG. 8 the cutaway necessary to accommodate the offset nut and the first lock rod is shown.

Figure 5:
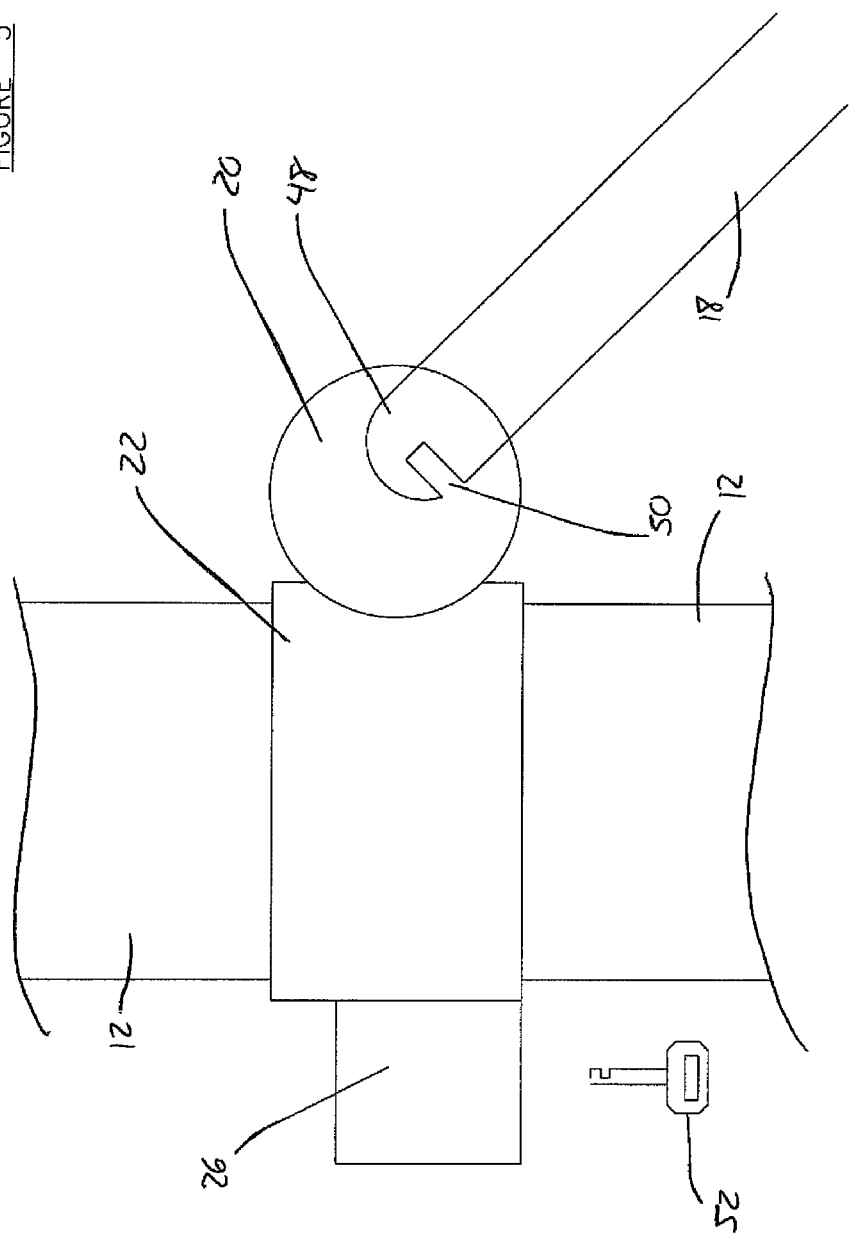
FIG. 5 is an elevation of the clamp of FIG. 4.

At FIG. 5 the second lock rod is shown inserted into but not engaged by the key lock. Rotation of the lock detent, as by the key, engages the detent with a corresponding lock recess at the male end of the second lock rod to prevent removal and rigidify the lock structure. The key lock is itself secured, for example as by welding, to the body of a clamshell clamp placed around the seat post and secured thereto by tightening of a bolt in a known manner. The head of the bolt is secured from access by a pivotal bolt cover operated by a key, again pivotally secured to the clamshell clamp, thus locking the clamp in place.

Figure 4:
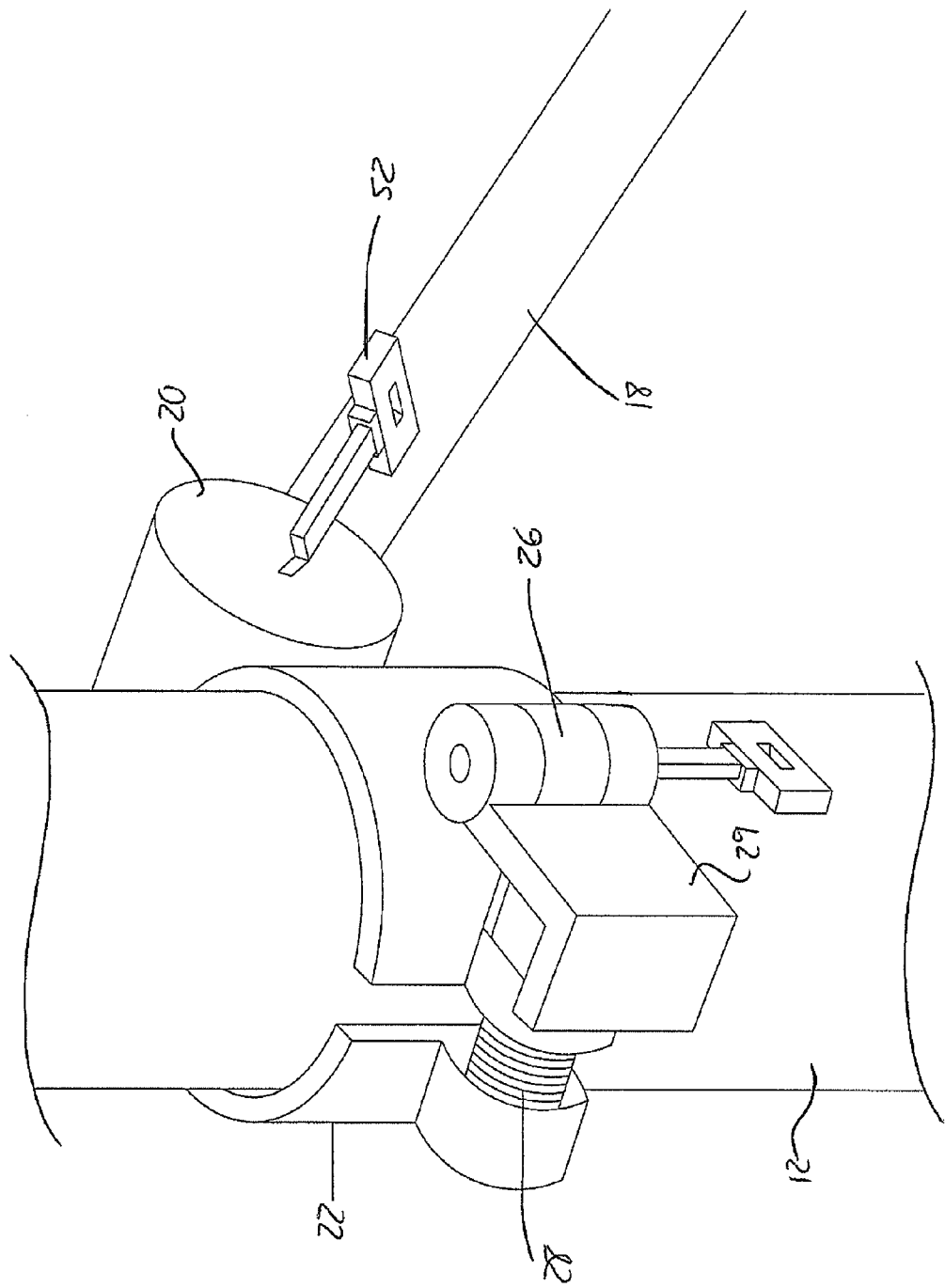
FIG. 4 is a partial perspective view of the seat post clamp.

Greater detail is shown in FIG. 4 wherein the lock detent is rotated by the key into a position of engagement with the male end recess. The clamshell lock includes a portion fixed to the clamshell and a pivotable bolt cover to prevent access to the bolt when engaged with the clamshell key 52, preferably the same key used for key lock 20.

Figure 9:
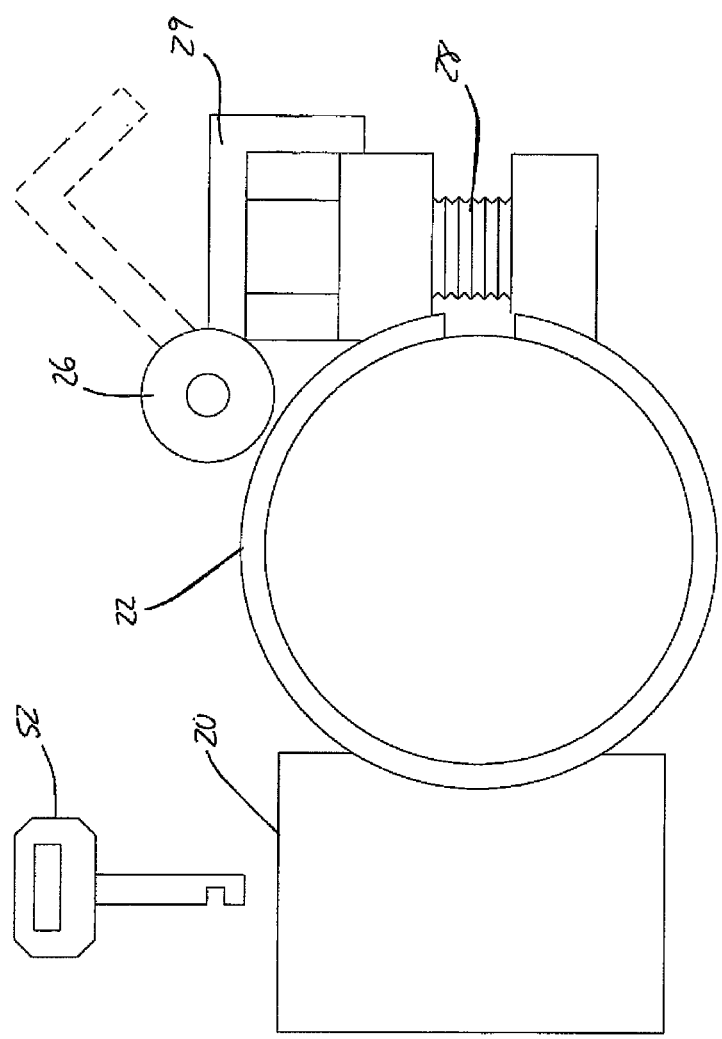
FIG. 9 is a top view of the seat post clamp and key lock.

At FIG. 9 the pivotable bolt cover 29 is shown in a closed, with its fully open position shown in dotted outline. As can be seen the tightening bolt engages both sides of the clamshell clamp. Rotation of the drive bolt 28 draws these sides together as the bolt threads engage into the threaded receiver.

FIGS. 10 through 24 depict a second preferred embodiment of the lock of the invention.

Figure 10:
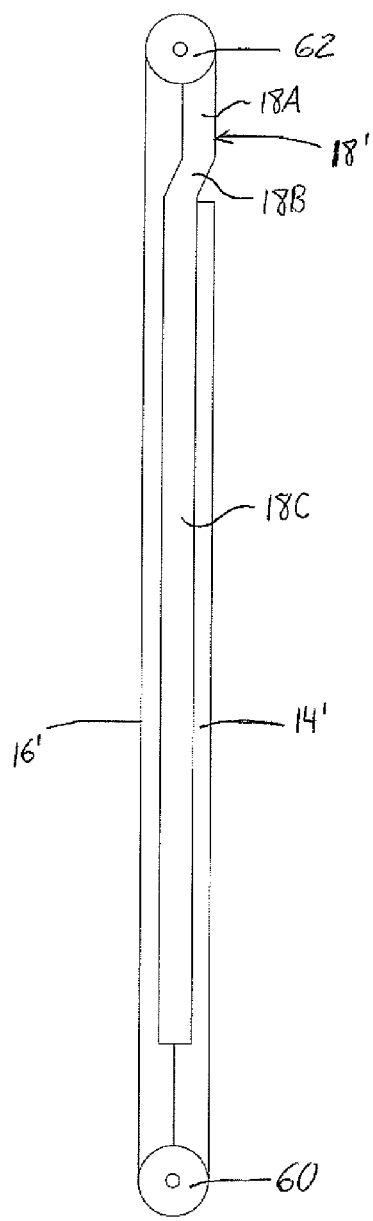
FIG. 10 is a perspective view of a second embodiment of the bicycle lock of the invention in fully folded up position for storage.

At FIG. 10 the three rods 14', 16', 18' are shown in the storage condition as connected each to the next by a first and second pivotal joint 60, 62 respectively, and stored in the seat post in a parallel side by side relationship with one another.

Figure 11:
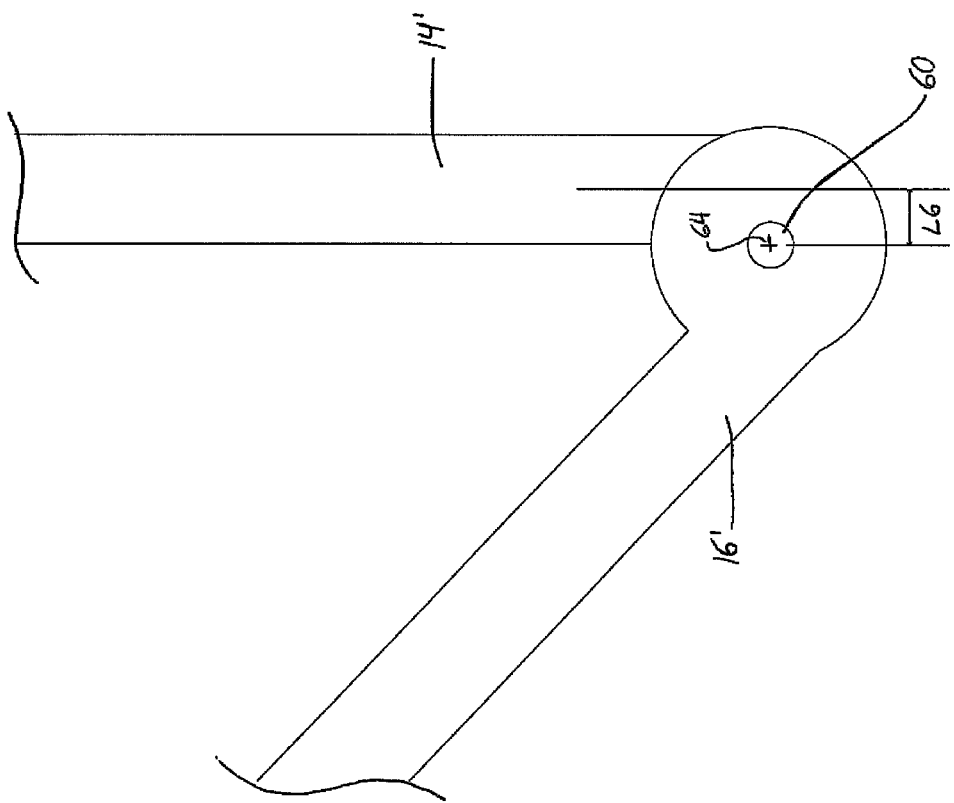
FIG. 11 is a partial perspective view of the first lock angle of the assembled lock of FIG. 10.

FIG. 11 shows an expanded partial view of the lock of FIG. 10. The internal rod 14' remains attached to the first lock rod 16' by a first pivotal joint 60 or hinged rivet operating between a flange on each rod for free rotation about first pivotal joint axis 64 offset from the internal rod axis by a distance L6. As can be seen in this embodiment the first lock rod is not rotatable about its length for threaded connection at a fixed first lock angle, but rather remains continuously attached to the internal rod while a variable first lock angle is available between the internal rod and the first lock rod by the pivotal joint therebetween.

Figure 12:
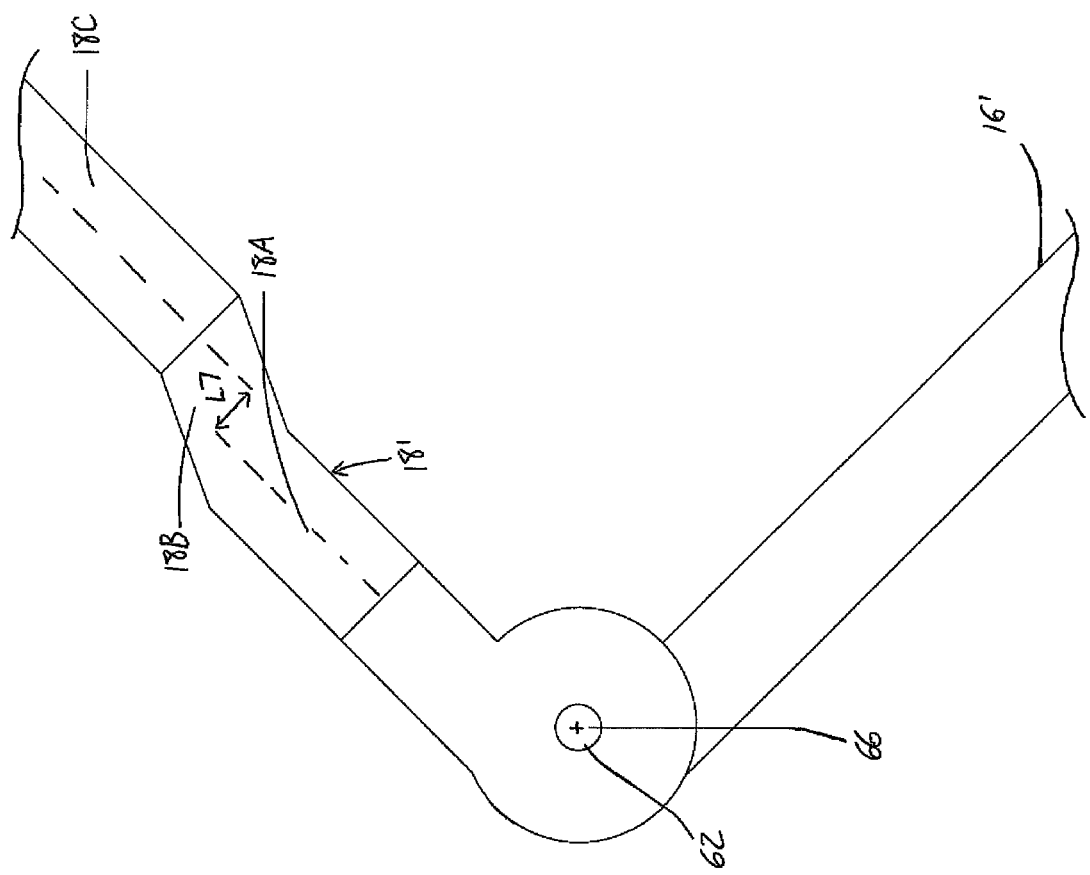
FIG. 12 is a partial perspective view of the second lock angle of the assembled lock of FIG. 10.
Figure 13:
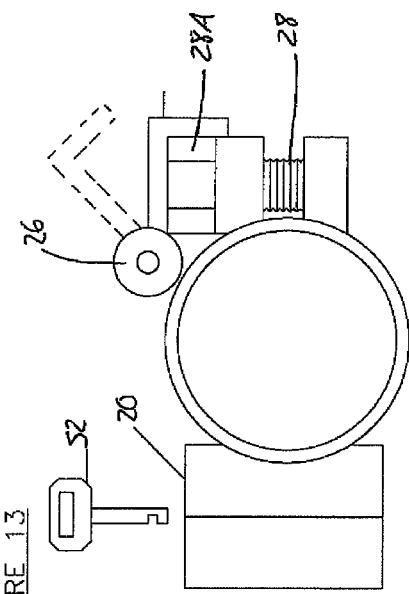
FIGS. 13 through 16 are various perspective views of the clamshell clamp, key lock and clamp lock.
Figure 14:
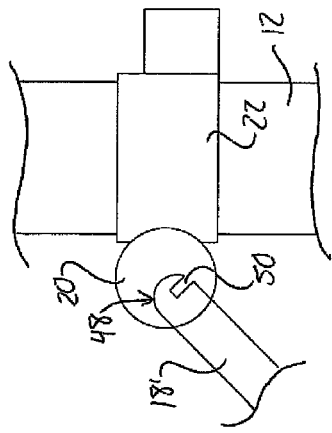
Figure 16:
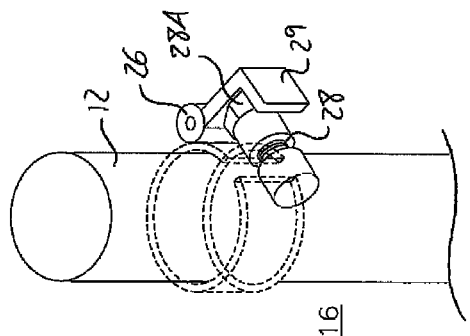
Figure 15:
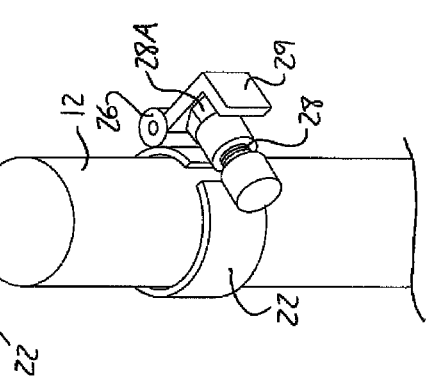

FIG. 12 shows another expanded partial view of the lock of FIG. 10. The second lock rod 18' is pivotally secured to the distal end of the first lock rod 16' at the second pivotal connection 62 for rotation about the pivotal axis 66 formed by the hinged rivet between the lock rod flanges.

Preferably the second lock rod includes a rod offset by a distance L7 along its main axis so as to provide a fold flat condition when fully folded for storage, as described in greater detail herein below.

FIGS. 13 through 16 provide additional views of the clamshell clamp, key lock and the clamp lock.

Figure 17:
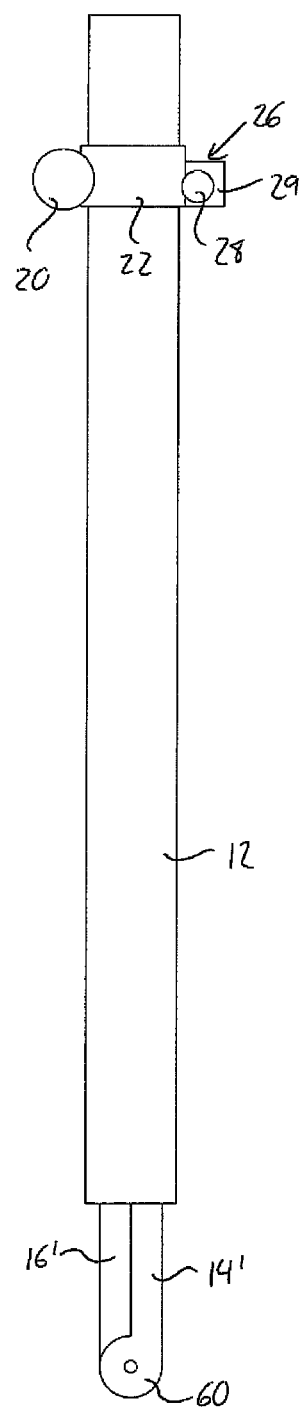
FIG. 17 is a perspective view of the lock in a storage position for the second embodiment of FIG. 10 depicting step 1, removal of the seat post from the bike and sliding the locking bar out of the post.
Figure 18:
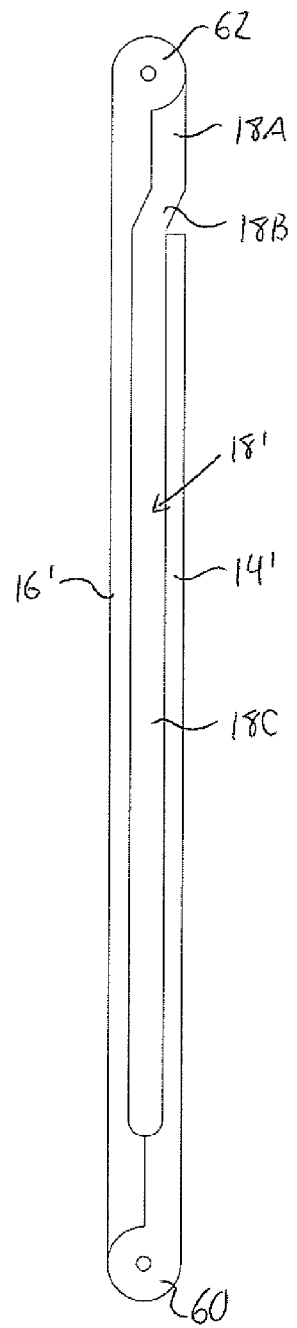
FIG. 18 is a perspective view of the lock of FIG. 17 as removed from the seat post.
Figure 19:
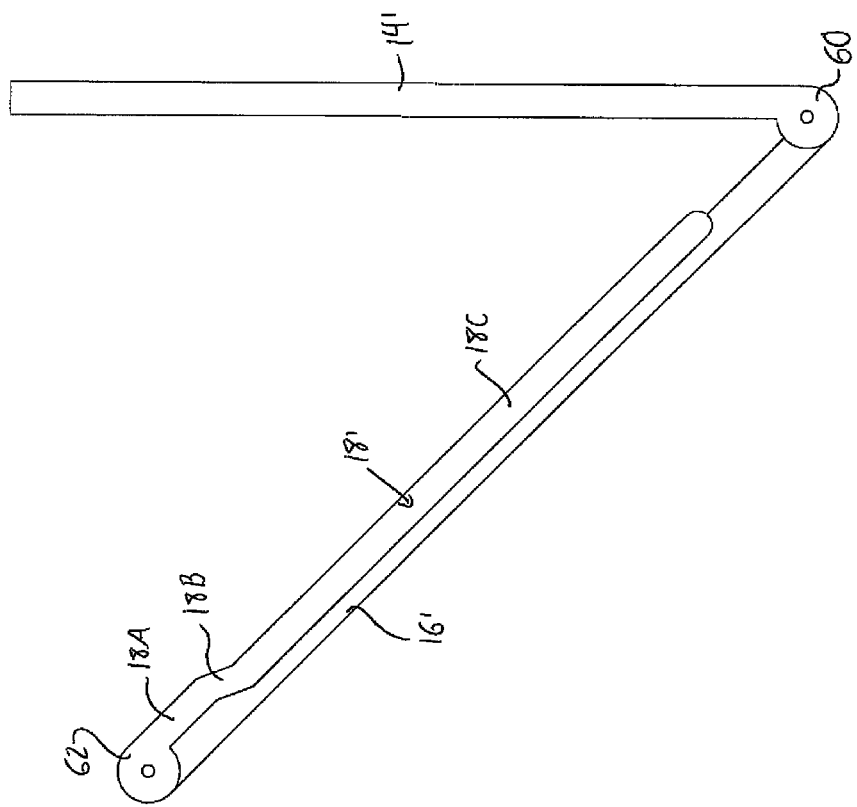
FIG. 19 is an elevation view of the lock of FIG. 18 with its first lock rod unfolded.
Figure 20:
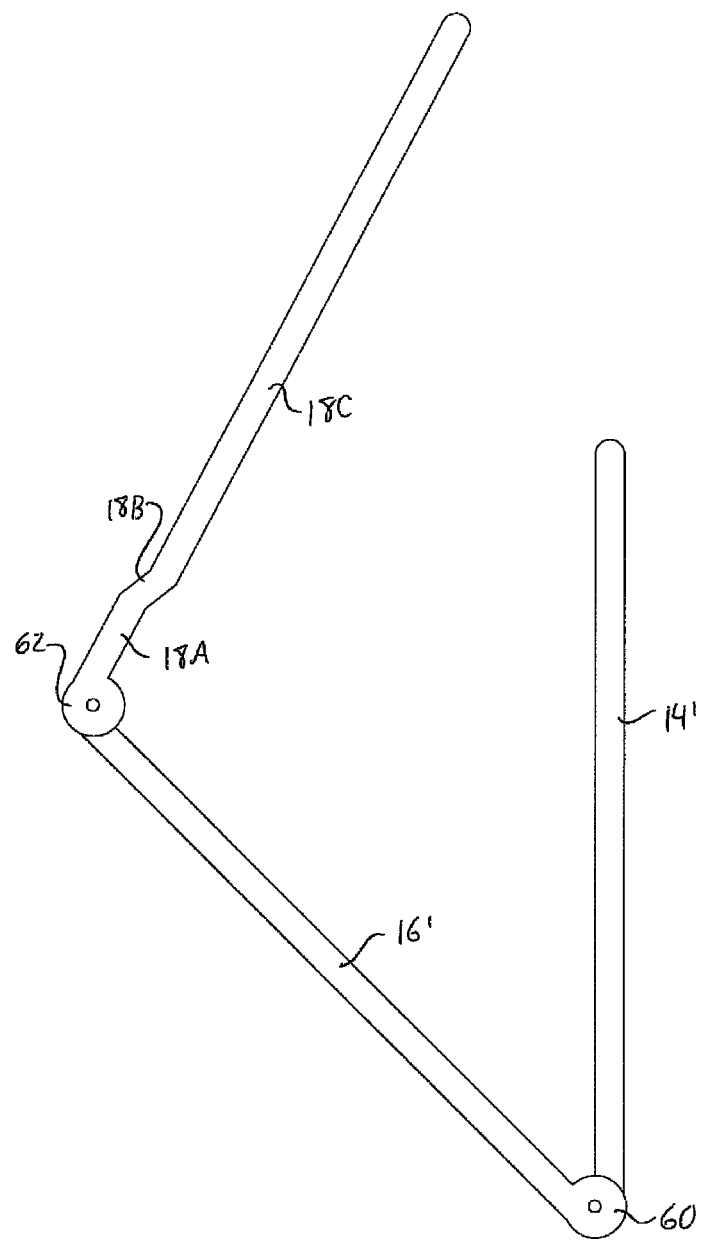
FIG. 20 is an elevation view of the lock of FIG. 19 with its second lock rod unfolded.
Figure 21:
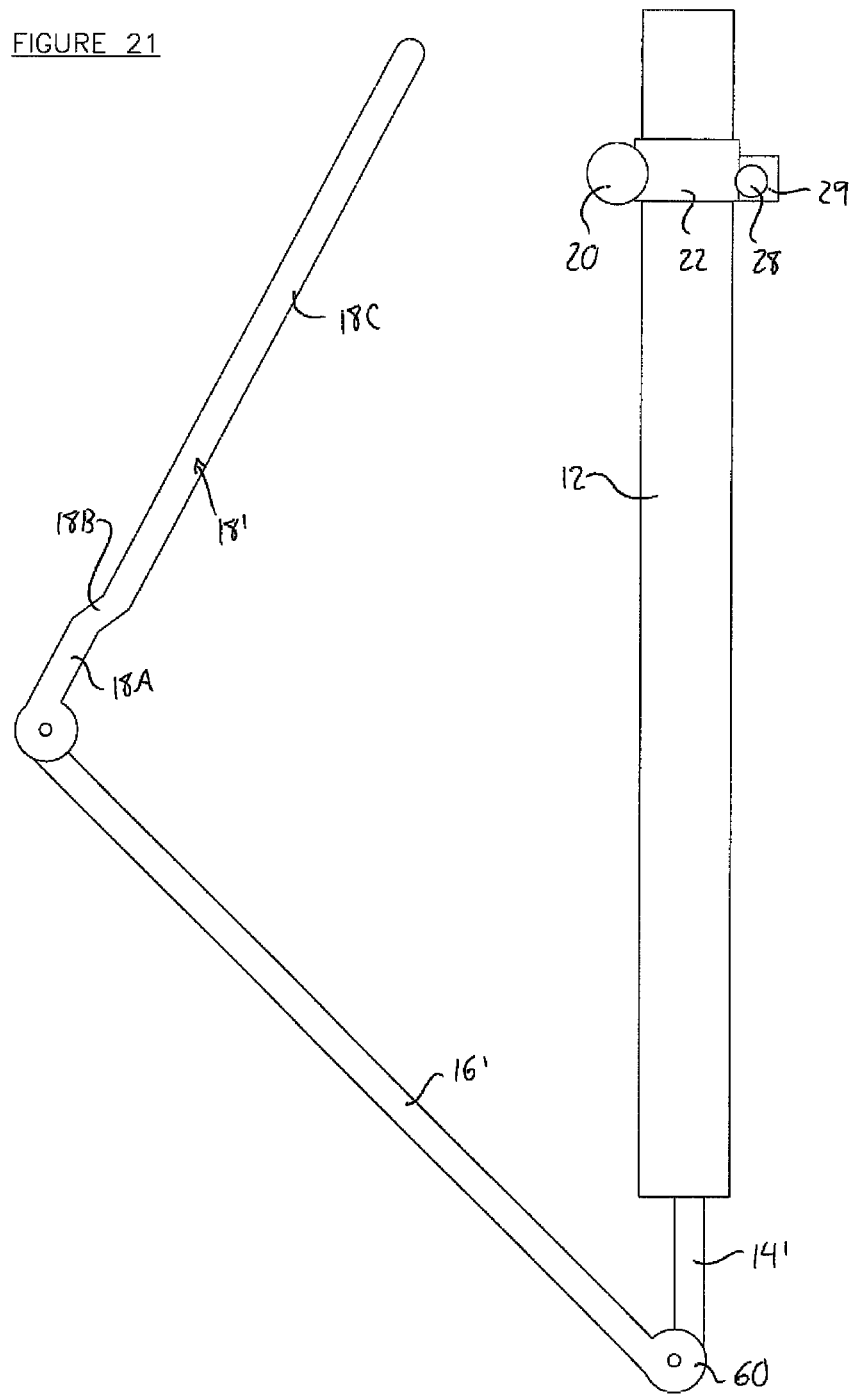
FIG. 21 is an elevation of the lock of FIG. 20 depicting the internal rod partially inserted into the seat post.
Figure 22:
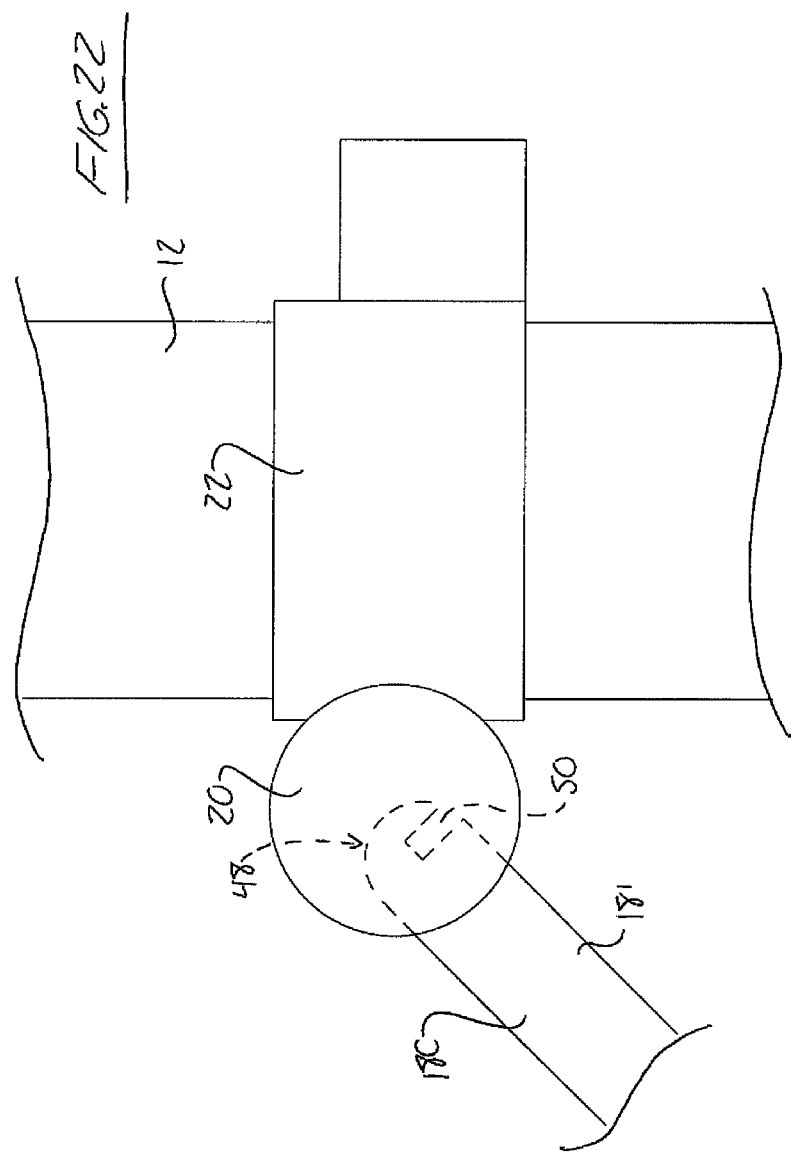
FIG. 22 is a close up view of the insertion of the second lock rod male end into the key lock.
Figure 23:
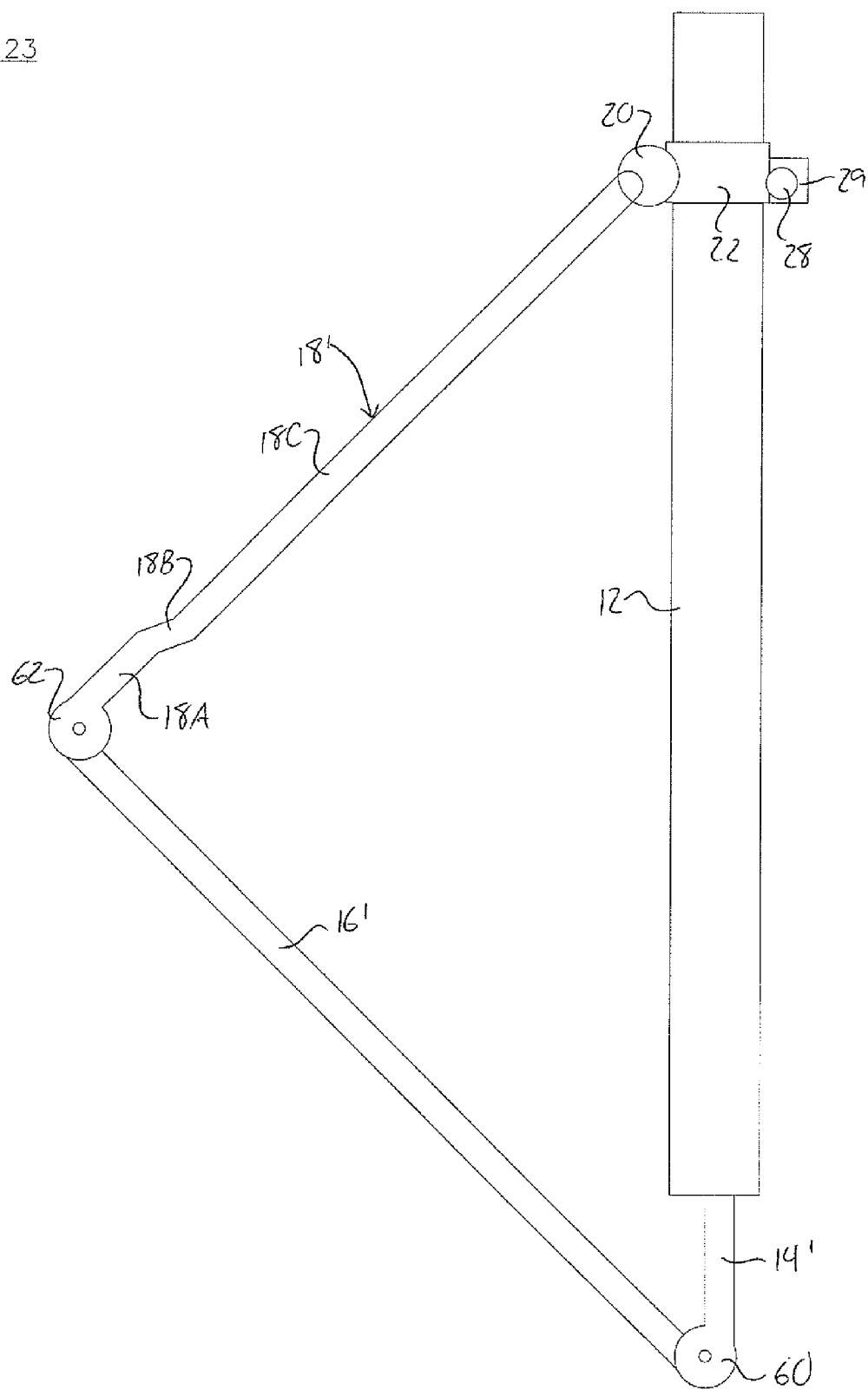
FIG. 23 is an elevation of the fully unfolded, closed and locked bicycle lock of the second embodiment.
Figure 24:
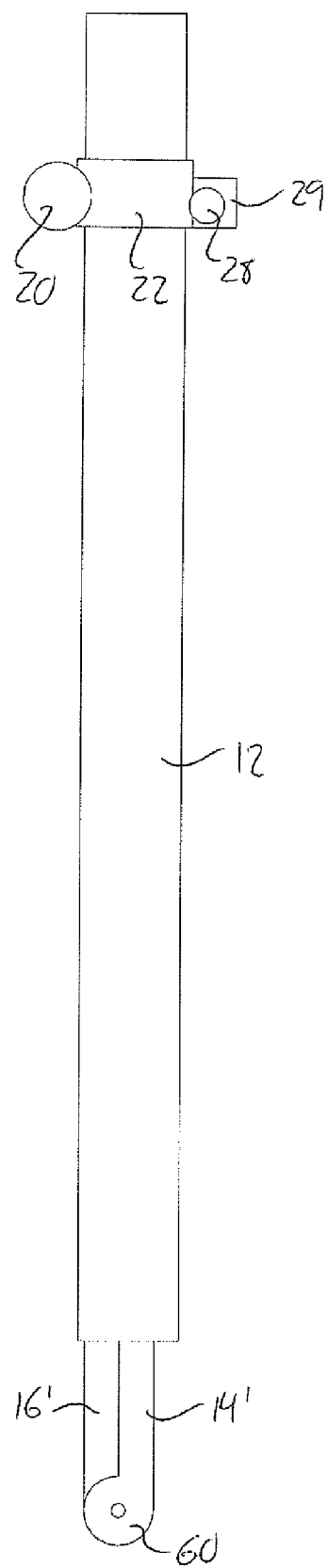
Figure 34C:
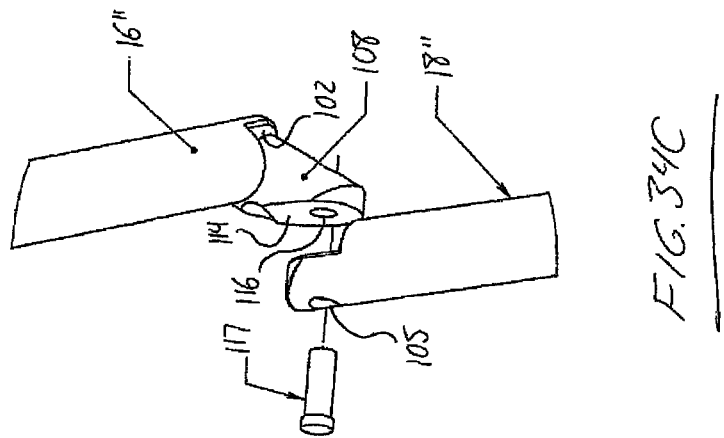
FIGS. 34B and 34C are close up views of the pivotal connections of FIG. 34A.
Figure 34B:
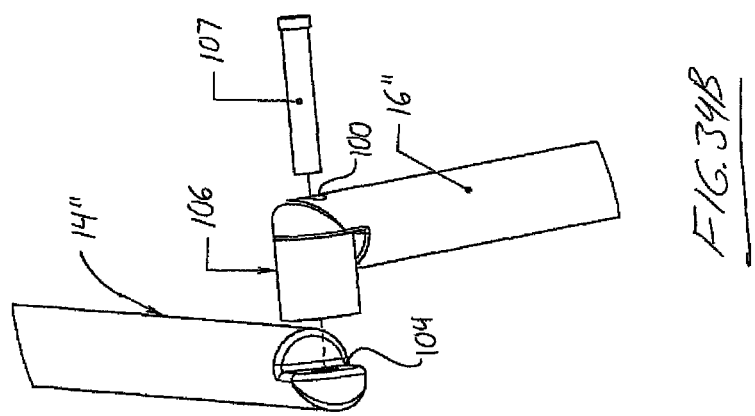
Figure 34A:
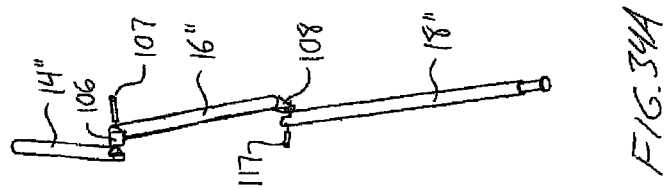
FIG. 34A is an exploded view of the rods of the third embodiment bicycle lock cover, illustrating the pivotal connections therebetween using the spacers of FIGS. 32 and 33.

FIGS. 17 through 24 show a step by step depiction of each step in the use of the bike lock of the second preferred embodiment from the fully stored condition of FIG. 17, starting with removal of the locking components from the seat post in FIG. 18, unfolding of the internal lock rod or bar to a first locking angle in FIG. 19, unfolding of the second lock rod or bar to a second lock angle in FIG. 20, and reinsertion of the unfolded lock as by sliding the internal lock rod back into the free end of the seat post in FIG. 21. At this point the lock components may be engaged with the bike frame, any wheels and a security object or bike rack. A next step is shown in FIG. 22 wherein the male end of the second lock rod is inserted and locked in place into the key lock 20. FIG. 23 shows a complete view of the lock, assembled and locked in place. As can be seen the lock structure has been somewhat flexible up to the point of the insertion of the male end into the key lock, as allowed by the first and second pivotal joints to accommodate storage and engagement with a variety of security objects. The lock then becomes rigid upon the single act of insertion of the male end into the key lock and becomes permanent once the lock itself is engaged by another single act, until the key lock is eventually later disengaged for removal of the lock.

Removal of the lock from its in-use condition and disassembly for storage is the reverse set of steps and results in all of the lock rod components being readily insertable back into the hollow interior of the seat post, ready again for travel and later locking up of the bicycle when required.

FIGS. 25 to 35 illustrate a third embodiment of the present invention. Like the preceding embodiments, one end of internal rod 14" inserts up into the seat post 12 through the opening at the free end thereof opposite the seat, leaving the opposite end of the internal rod exposed outside the seat post beyond the free end thereof. Like the second embodiment, the rods are pivotally coupled together at their ends so that the first lock rod 16" can extend obliquely from the internal rod 14", with the second lock rod 18" being obliquely positionable relative to the first lock rod 16" to connect to the seat post clamp and form a triangular configuration among the longitudinal axes of the rods. The second lock rod 18" is again lockable to the seat clamp, which in turn is lockable to the seat post, so that the rods and seat post are lockable together in a rigid triangular configuration. The third embodiment differs from the preceding embodiments primarily in the details of the locking engagement between the seat post, clamp and second lock rod, and the details of the pivotal rod configurations.

FIGS. 25A and 25B show the overall assembly in locked and unlocked conditions respectively. A notable difference in the third embodiment is that a single key lock 70 is operable to both lock the second lock rod 18" to the seat post clamp 22 and lock a cover member 72 in place in a locking position blocking access to the tightening bolt 28 that tightens the clamp 22 in place. The combination of the key lock 70 and the cover member 72 is shown in isolation in FIG. 26. The cover member 72 is a somewhat box-shaped unit having a pair of parallel side walls 74, 76 each disposed at respective sides of the seat post to project outwardly therefrom to support a slotted wall 78 perpendicularly between the side walls 74, 76 at a radial distance outward from the circumference of the seat post. A top wall 80 spans between the top ends of the side walls and slotted wall. The side walls and slotted wall therebetween lie in planes that are parallel to the longitudinal axis of the seat post, and the top wall is perpendicular to these planes. The slotted wall 78 features a rectangular slot 81 jutting upwardly into the wall from the lower edge thereof at a central position along this edge. The walls each face inward into a hollow interior space of the cover member 72.

The key lock 70 features an internal cylinder 82 having opposite end portions housed within external cylinders 84, 86 that form a housing of the key lock 70. Either the housing or the internal cylinder of the key lock is fixed to one of the side walls 74 of the cover member 72 near the end thereof opposite the cover member's slotted wall 78, for example by welding. One of the outer cylinders 84, (the lower one in the illustrated embodiment) is open at is outer end, where the key slot of the key lock is accessible to operate the tumbler, which in a conventional manner uses rotation of the key to change the lock between a locked condition, in which the inner and outer cylinders are locked against relative rotation, and an unlocked position where the inner and outer cylinders can rotate relative to one another. The other of the housing or internal cylinder of the key lock is fixed to the exterior of the seat post clamp 22, for example by welding. Accordingly, the cover member 72 can pivot relative to the seat post clamp 22 about the rotational axis of the key lock when the key lock is in the unlocked condition. The rotational axis of the key lock is parallel to the seat post axis, around which the seat post clamp concentrically closes.

The seat post clamp 22 features a clamping portion 88 with an arcuate inner face closing a substantial portion around the seat post axis, but leaving a small gap between its free ends. On opposite sides of this gap, lugs 90 are fixed to the exterior of the clamping portion and feature aligned through-bores extending in a substantially tangential direction relative to the circular shape of the clamping portion. The tightening bolt of the seat clamp is operable through the bores of the lugs to draw the lugs together under tightening of the bolt, thereby closing the clamping portion of the seat post clamp tighter around the seat post to secure the clamp in place thereon. The key lock 70 is attached to the clamping portion 88 of the clamp 22 off to one side of the lugs.

The top wall 80 of the cover member 72 has an arcuate cut-out 91 in the free edge thereof opposite the slotted wall 78, cutting into an otherwise rectangular span of the top wall between the side walls 74, 76. In a closed locking position of the cover member, the arcuate cut-out at in the top wall of the cover member 72 abuts conformingly against the seat post or the clamping portion of the clamp at a location over the lugs 90 and tightening bolt 28 so that the side walls 74, 76 and the slotted wall 78 to close around the lugs and tightening bolt. Accordingly, when the key lock 70 is used to lock the cover member 72 in the closed position, a would-be thief is prevented from being able to loosen the clamp-tightening bolt and slide the clamp off the seat post to remove the lock.

The second lock rod 18" features a reduced diameter portion 92 adjacent an enlarged head 94 that is situated at the distal end opposite the first lock rod 16". The reduced diameter portion 92 has a diameter less than the width of the slot 81 in the slotted wall 78 of the cover member 72, while the enlarged head 94 has a diameter exceeding the width of the slot 81. With reference to FIG. 25B, when use of the lock is desired, the key lock 70 is unlocked and the cover member 72 is swung from the closed position over the clamp lugs into an open/unlocked position off to one side of the seat post and clamp.

As described for the other embodiments, in the internal rod 14" is inserted into the seat tube, and the lock rods are angled into suitable positions to bring the free end of the second lock rod toward the seat post clamp 22. As shown in FIG. 25B, the second lock rod is positioned to place the enlarged head 94 and neighbouring reduced diameter portion 92 against the outer side of the clamp lugs 90. At this point, with the key lock 70 still unlocked, the cover member 72 is swung back into the closed position concealing the clamp lugs 90 and the tightening bolt passing therethrough. This closing action of the cover member acts to pass the slot 81 of the cover member's slotted wall 78 over the reduced diameter portion 92 of the second lock rod 18" to enclose the enlarged head 94 of the second lock rod inside the interior space of the cover member 70 with the lugs and tightening bolt. The key lock is then used to lock the cover member in this closed/locked position. The enlarged head of the second lock rod is too large to be pulled back through the slot 81, which together with the inability to angularly adjust the locked-in-place rods, prevents the second lock rod from being disengaged from the locked cover member. The single locking action used to secure the cover member in place acts to both prevent access to the bolt of the seat post clamp and lock the rods in place.

FIG. 29 shows the internal rod 14" of the third embodiment in isolation. The otherwise cylindrical rod is rounded at the distal end that is connected to the first lock rod 16" and exposed outside the seat tube in use of the lock, and is notched away from one side at this end, leaving a flat face 96 in a diametrical plane containing the central longitudinal axis of the cylindrical remainder of the rod. A bore 97 passes perpendicularly through this flat face 96 at the central axis of the rod in a manner concentric with the rod's rounded end.

FIG. 30 shows the first lock rod 16", which has the same end configuration at the proximal end thereof so as to leave a matching flat face 98 and bore 100 in a diametrical plane. The opposite distal end of the first lock rod is likewise rounded and notched to leave another flat face 102, but in a diametrical plane that is angularly offset from the flat face 98 at the proximal end of the rod 16" by 60-degrees about the rod axis.

FIG. 31 shows the second lock rod 18" in isolation, the proximal end of which again features a flat face 104 in a diametrical plane and a concentric radial bore 105 passing perpendicularly through it. The opposing distal end features the above-described reduced diameter portion and enlarged head.

FIG. 32 illustrates a cylindrical washer or spacer 106 of uniform cylindrical exterior and a cylindrical through-bore running centrally through it. This spacer 106 is employed between the flat faces at the notched ends of the internal rod and first lock rod, with its flat faces placed against those of the rods to space the two rods slightly apart so as to be movable past one another in respective parallel planes under pivotal motion between them via a pivot pin 107 passed through the aligned bores in the rods and spacer.

FIG. 33 illustrates a non-cylindrical, obliquely-angled washer or spacer 108 for use between the flat faces of the first and second lock rods. The washer has the general shape of a cylinder that has been truncated by a flat plane cutting through it from a first end face of the cylinder toward the other end face 110 at 30-degrees relative to the cylinder's longitudinal axis, with the remainder of the first end face then being rounded off and the cylinder being further cut away to form a small arcuate notch 112 at the end of the truncation plane nearest the full circular end face 110. A short-length cylindrical portion 113 remains intact between the notch 112 and the circular end face 110. The truncation creates a flat oblique face 114 oriented at an oblique angle relative to the longitudinal axis that cuts perpendicularly through the full circular end face 110. A through-bore 116 passes perpendicularly through the spacer at oblique face 114.

The circular end face 110 of the spacer is placed against the flat face at the distal end of the first lock rod 16" and is fixed thereto, and the oblique face 114 is placed against the flat face at the proximal end of the second lock rod 18". A pivot pin 117 passes through the bore 105 in the distal end of the second lock rod 16", and through the aligned bore 116 of the oblique spacer 108. Although not readily apparent from the schematic assembly views of FIG. 34, the resulting pivot axis defined between the two lock rods by the pivot pin 117 is perpendicular to the longitudinal axes of the rods, but offset from (i.e. non-intersecting with) the longitudinal axis of the first lock rod at a radial distance therefrom, as more clearly seen from the cross-sectional and side views of FIG. 35.

FIG. 35 shows the rods when folded into parallel orientations with one another for compact storage. In storage, the rods occupy a triangular configuration in which the insertion rod 14" and first lock rod 16" reside side by side in close proximity with a portion of the insertion rod's circumference received in the arcuate notch 112 of the oblique spacer 108, and the axis of the second lock rod lies in a plane that perpendicularly intersects a plane containing the two axes of the other two rods at a central location between those two axes. The plane containing the axes of the first and second lock rods lies at sixty degrees to the plane containing the axes of the interior rod and first lock rod, and also at sixty degrees to the plane containing the axes of interior rod and the second lock rod. In other words, the axes of the three rods lie at the vertices of an equilateral triangle in cross-sectional planes perpendicular to these axes, thus providing the most space-efficient storage of three equal-diameter, parallel, circular rods. This way, the diameter and resulting strength of the rods can be maximized for a given seat post size in which the rods need to fit.

Although the preferred pivotal-rod embodiment employs three rods, thus balancing the desire to use substantially straight rods that can fit together within the seat post for storage with the desire to minimize the number of parts to keep the complexity to a minimum, it will be appreciated that other embodiments may employ more than two lock rods to form the connection between the internal rod and the locking mechanism on the seat clamp, provided that any achievable pivotal motion of the final rod that connects to the locking mechanism is insufficient to allow release the rod from the engagement of the locking mechanism. Likewise, the number of non-pivotal threaded rods in the first embodiment, and the resulting polygonal shape bound between the rods and the seat post when the lock is employed, may be varied without departing from the scope of the present invention.

Turning back to FIGS. 10 to 12, the rods of the second embodiment fold up into the same general triangular configuration as the third embodiment, but don't rely on an angled spacer or washer to do so. The second lock rod 18' features a short linear portion 18a extending from the pivotal connection at its proximal end of the lock rod with the axis of this short linear portion 18a offset radially outward from the pivot axis of the pivotal connection so that the short linear portion lies adjacent and parallel to the first lock rod 16', which is likewise offset from the pivot axis, when the rods are folded in the storage condition. From this short linear portion, the rod then bends to an angular portion 18b that angularly deviates from the axis of the short linear portion 18a in two dimensions, and then bends into a longer linear portion 18c that runs to the distal end of the rod in an orientation parallel to the short linear portion 18a.

The longitudinal axis of the longer linear portion 18c intersects the pivot axis at the proximal end of the rod in the same plane as the pivot axis when the rods are folded in the storage configuration. The internal rod 14' and first lock rod 16' are offset from the pivot axis between them to lay side-by-side and parallel to one another on opposite sides of this pivot axis when the rods are folded. The internal rod 14' is shorter than the first lock rod so as to stop short of the bent angular portion 18b of the second lock rod when the rods are folded in the storage condition so that the longitudinal axes of the internal rod 14' and the shorter linear portion 18a of the second lock rod can be positioned in alignment. The internal rod 14', first lock rod 16', and longer linear portion 18c of the second lock rod 18' lie in the compact triangular configuration described above for the third embodiment when the rods of the second embodiment are folded into the storage condition by using a simple bend in the second lock rod to avoid the need for an angular washer and simplify the pivotal connections between the rods.

In the second embodiment, the internal rod, first lock rod, and short linear portion of the second lock rod all pivot in the same plane, each pivotal joint using the illustrated flat circular flanges at the ends of the joined rods with central bores in the flanges that are offset from the rod axes and with flanges thicknesses of slightly more than half the rod diameter, so that the flanges fit face-to-face without spacers in order to slide over one another in pivotal motion of the rods about a pivot pin passed through the aligned bores of the flanges. The bend of the second lock rod brings the rod out of the common plane of the other rods to bend over the free end of the internal rod 14'. In comparison, the three rods of the third embodiment instead pivot in three respective parallel planes.

It should be understood, of course that the foregoing relates to exemplary embodiments of the invention and that modifications may be made without departing from the spirit and scope of the invention described and shown in the accompanying drawings.

The invention claimed is:

1. In combination, a bicycle seat post and a seat post bicycle lock cooperable therewith, the seat post bicycle lock comprising:
   a series of rods including a pair of lock rods and an insertion rod that is arranged for insertion into the seat post through a free end thereof in a position leaving an exposed end of said insertion rod outside the seat post, the series of rods being arranged to be secured together end-to-end at relative angles to one another outside the seat post to lie on respective sides of a polygonal area with the insertion rod at one end of the series and a one of the lock rods at a second end of the series;
   a clamp arranged to clamp around the seat post at a distance from the free end thereof; and
   a lock mechanism attached to the clamp and arranged to lock the one of the lock rods to the clamp;
   wherein the series rods are connected by pivotal joints therebetween by which the lock rods and the insertion rod are foldable into a storage condition in which the lock rods and the insertion rod lie parallel to one another with longitudinal axes of the lock rods and the insertion rod occupying a triangular configuration lying on vertices of a triangle in a cross-sectional plane perpendicular to said longitudinal axes.

2. The combination of claim 1 wherein lock rods and the insertion rod comprise two straight rods and a third bent rod coupled together for pivoting in a common plane, with a bend in the bent rod deviating from the common plane to bend over an end of one of the two straight rods to position a linear portion of the bent rod in the triangular configuration with the two straight rods.

3. The combination of claim 1 wherein a first one of the pivotal joints comprises an oblique spacer that is fixed to a first one of the rods and is coupled to a second one of the rods by a first pivot pin that passes through only one of the rods, and a second one of the pivotal joints defined between the first one of the rods and a third one of the rods comprises a second pivot pin that passes through both the first one of the rods and the third one of the rods.

4. The combination of claim 1 wherein the series of rods, when in the storage condition, are fittable together within the seat post.

5. The combination of claim 1 wherein the lock mechanism is key operated.

6. The combination of claim 1 wherein the lock mechanism is operable to both close the clamp around the seat post and lock the one of the lock rods to the clamp.

7. The combination of claim 6 wherein the lock mechanism comprises a cover member pivotally coupled to the clamp for movement into and out of a lockable position in which the cover member conceals a closure of the clamp and captures an end of the one of the lock rods.

8. The combination of claim 7 wherein the cover member comprises a slotted wall spaced outwardly from the clamp to leave an accommodating space between the slotted wall and the clamp for receipt of an enlarged portion of the one of the lock rods adjacent the end thereof, the slotted wall having a slot therein running parallel to an axis about which the at clamp extends, the slot having a width sufficient to slide over a reduced diameter portion of the one of the lock rods on a side of the enlarged portion opposite the end of said one of the lock rods.

9. The combination of claim 7 wherein the cover member is arranged to pivot about a pivot axis that is parallel to a seat post axis about which the clamp extends.

10. The combination of claim 7 wherein the lock mechanism comprises a key cylinder operable to switch between locked and unlocked states respectively preventing and allowing pivotal movement of the cover member from the lockable position.

11. The combination of claim 1 wherein the series of rods consists only of said insertion rod and said pair of lock rods.

12. The combination of claim 1 wherein the triangle on which the longitudinal axes of the lock rods and the insertion rods lie in the storage condition is an equilateral triangle.

13. The combination of claim 2 wherein the triangle on which the longitudinal axes of the lock rods and the insertion rods lie in the storage condition is an equilateral triangle.

14. In combination, a bicycle seat post and a seat post bicycle lock cooperable therewith, the seat post bicycle lock comprising:
   a series of rods including a plurality of lock rods and an insertion rod that is arranged for insertion into the seat post through a free end thereof in a position leaving an exposed end of said insertion rod outside the seat post, the rods being arranged to be secured together end-to-end at relative angles to one another outside the seat post to lie on respective sides of a polygonal area with the insertion rod at one end of the series and a final one of the lock rods at a second end of the series;
   a clamp arranged to clamp around the seat post at a distance from the free end thereof; and
   a lock mechanism attached to the clamp, arranged to lock the final one of the lock rods to the clamp, and operable to both close the clamp around the seat post and lock the final one of the lock rods to the clamp;
   wherein the lock mechanism comprises a cover member pivotally coupled to the clamp for movement into and out of a lockable position in which the cover member conceals a closure of the clamp and captures an end of the final one of the lock rods.

15. The combination of claim 14 wherein the cover member comprises a slotted wall spaced outwardly from the clamp to leave an accommodating space between the slotted wall and the clamp for receipt of an enlarged portion of the final one of the lock rods adjacent the end thereof, the slotted wall having a slot therein running parallel to an axis about which the clamp extends, the slot having a width sufficient to slide over a reduced diameter portion of the final one of the lock rods on a side of the enlarged portion opposite the end of said final one of the lock rods.

16. The combination of claim 14 wherein the cover member is arranged to pivot about a pivot axis that is parallel to a seat post axis about which the clamp extends.

17. The combination of claim 14 wherein the lock mechanism comprises a key cylinder operable to switch between locked and unlocked states respectively preventing and allowing pivotal movement of the cover member from the lockable position.

18. The combination of claim 14 wherein the plurality of lock rods consists of only two lock rods, and the series of rods consists only of said insertion rod and said two lock rods.

* * * * *